(12) United States Patent
Nagai et al.

(10) Patent No.: US 7,668,421 B2
(45) Date of Patent: Feb. 23, 2010

(54) OPTICAL COUPLING LENS AND LIGHT SOURCE

(75) Inventors: Fumio Nagai, Hachioji (JP); Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/028,153

(22) Filed: Feb. 8, 2008

(65) Prior Publication Data

US 2008/0193083 A1 Aug. 14, 2008

(30) Foreign Application Priority Data

Feb. 13, 2007 (JP) .............................. 2007-032055
Mar. 30, 2007 (JP) .............................. 2007-093091

(51) Int. Cl.
*G03H 1/22* (2006.01)
(52) U.S. Cl. .............................. 385/33; 385/27; 385/39; 359/641
(58) Field of Classification Search ........................ None
See application file for complete search history.

(56) References Cited

U.S. PATENT DOCUMENTS

| 4,111,558 A * | 9/1978 | Ikemori ........................ 359/708 |
| 4,901,298 A * | 2/1990 | Masaki ........................ 369/30.36 |
| 4,953,171 A | 8/1990 | Nakajima et al. |
| 5,119,238 A * | 6/1992 | Igarashi ........................ 359/714 |
| 2001/0053489 A1* | 12/2001 | Dirksen et al. ................. 430/30 |
| 2002/0054428 A1 | 5/2002 | Seward |
| 2003/0048545 A1 | 3/2003 | Han |
| 2005/0078383 A1 | 4/2005 | Jones et al. |
| 2006/0045423 A1 | 3/2006 | Morris et al. |

FOREIGN PATENT DOCUMENTS

| DE | 3 830 119 A1 | 3/1990 |
| EP | 1 560 052 A1 | 8/2005 |
| JP | 10-268157 | 10/1998 |
| JP | 2000-147311 | 5/2000 |
| JP | 2003-338795 | 11/2003 |
| JP | 2005-222049 | 8/2005 |

OTHER PUBLICATIONS

European Search Report Dated Jun. 25, 2008.

* cited by examiner

*Primary Examiner*—Uyen-Chau N Le
*Assistant Examiner*—Chad H Smith
(74) *Attorney, Agent, or Firm*—Finnegan, Henderson, Farabow, Garrett & Dunner, L.L.P.

(57) ABSTRACT

The present invention relates to an optical coupling lens and light source module. An optical coupling lens is provided for converging a light flux emitted from a light source to an entrance aperture. The optical coupling lens satisfies a predetermined condition according to a third-order astigmatisms coefficient of the optical coupling lens. A light source module includes: a light source; an optical waveguide; and an optical unit including one or more of an optical coupling lens for converging a light flux emitted from the light source onto the optical waveguide. At least one optical coupling lens satisfies predetermined condition according to a third-order astigmatism coefficient of the optical coupling lens.

21 Claims, 18 Drawing Sheets

AMOUNT OF SPOT DISPLACEMENT IN OPTICAL AXIS DIRECTION /
DIRECTION PERPENDICULAR TO OPTICAL AXIS [μm]

OPTICAL COUPLING LENS AND LIGHT SOURCE

This application is based on Japanese Patent Applications No. 2007-032055 filed on Feb. 13, 2007, and No. 2007-093091 filed on Mar. 30, 2007, in Japanese Patent Office, the entire content of which is hereby incorporated by reference.

TECHNICAL FIELD

The present invention relates to an optical coupling lens for converging light emitted from a light source to an entrance aperture of an optical waveguide forming an optical transmission line therein, such as well as an optical fiber, and SHG element and others. Further, the present invention also relates to a light source with this lens mounted thereon.

BACKGROUND

One of the techniques known in the conventional art is a semiconductor light source module capable of ensuring that the laser beam emitted from a semiconductor laser as a light source is converged through a light converging optical system on the end of an optical waveguide forming an optical transmission line therein, such as an optical fiber and an SHG element.

As shown in FIG. 1, an example in the conventional art is given by the light source wherein light 2 from a laser diode 1 is converged on entrance end 5a of the optical waveguide of a second harmonic generator (SHG) element 5 through the first lens 3 and second lens 4 to be propagated in the optical waveguide, thereby the second harmonic light is outputted from the other end of the optical waveguide.

In the light source module in which an optical waveguide propagates light from the light source to output the light, the light from the light source is requested to be converged onto the entrance end of the optical waveguide and the light flux is requested to be effectively coupled with the optical waveguide.

However, in the assembling of passive alignment, a light-converged spot on the entrance end 5a is displaced due to an assembling error. Therefore, it reduces the coupling efficiency, or prevents light from coupling with the optical waveguide at all. For example, the single mode fiber has a core whose diameter or mode field diameter does not exceed 10 μm and the multi-mode fiber has a core whose diameter or mode field diameter is about 50 μm. Further, some optical waveguides in a device such as SHG element have a core whose diameter or mode field diameter is several μm. Since light is required to enter this microscopic area, an optical element such as a semiconductor laser, lens and waveguide is also requested to be adjusted on the microscopic level. Thus, an excellent coupling performance is hardly ensured in passive alignment, and the yield rate is also poor, which are problems.

To solve these problems, attempts have been to mount a lens moving mechanism on the lenses 3 and 4 and to adjust the positions of the lenses 3 and 4 so that the light-converged spot will enter the entrance end 5a, whereby the coupling efficiency is optimized.

Unexamined Japanese Patent Application Publication (JP-A) No. 2005-222049 discloses an invention wherein a weak lens is arranged between the first lens 3 and second lens 4, and this weak lens is shifted in the direction of optical axis. In this invention, the amount of change in coupling efficiency is small with respect to the shift of the weak lens, hence adjustment precision is alleviated and adjustment is facilitated.

Further, JP-A No. 2003-338795 discloses a technique as follows: when the laser beam emitted from a semiconductor laser is converged onto the end of an optical fiber through a light-converging optical system, light reflected from the end or light passing through the optical transmission line is detected and the light-converging optical system is driven in the direction perpendicular to the optical axis, whereby a spot is properly converged onto the end of the optical fiber.

The technique in the invention described in JP-A No. 2005-222049, requires one weak lens additionally to alleviate the adjustment precision. This signifies an increased number of lenses, more complicated structure, upsized configuration and increased cost. The technique in the invention disclosed in JP-A 2003-338795, in which the lens is moved by an actuator, can cause a deterioration in coupling due to an aberration caused when the lens is driven and adjusted. This may increase sensitivity in the lens drive and adjustment. To solve the problem, two or more lenses can be used to form the optical system for converging the light flux from the light source onto the end of the optical fiber or the waveguide of the SHG element. When a plurality of lenses are moved, ideal adjustment of the light flux converging position can be achieved if each lens can be moved in a three-dimensional space. The drive apparatus for moving each lens in a three-dimensional space involves the problem of complicated structure and upsized configuration. Thus, there has been a demand for achieving the simplest possible structure of the drive apparatus by restricting the lens drive direction, for example.

The following discusses the relationship between a direction of spot displacement and coupling efficiency.

FIG. 2 is a chart showing a change in the coupling efficiency with respect to spot displacement in the direction of optical axis (Z-axis direction in FIG. 1) and in the direction perpendicular to the optical axis (X- and Y-axis directions in FIG. 1) when the mode radius of the light-converged spot and that of the SHG waveguide each are 2.5 μm in the optical system of FIG. 1. As is apparent from this chart, a change in coupling efficiency with respect to the displacement in the direction of optical axis is more gradual than that with respect to the displacement in the direction perpendicular to the optical axis.

Based on this finding, the module can be simplified if the direction of correcting the lens position is restricted to the direction perpendicular to the optical axis and the mechanism of shifting the lens in the direction of optical axis is not used. Adjustment precision in the Z-axis direction is less severe. Accordingly, if the lens position is adjusted in the X- and Y-axis directions along after high-precision assembling, it is possible to produce a module of high coupling efficiency with the optical waveguide.

Despite the highest possible assembling precision in the Z-axis direction, when the lens position is adjusted in the direction perpendicular to optical axis, the light-converged spot is displaced in the direction perpendicular to optical axis as well as in the direction of optical axis. This results in poor coupling efficiency.

To solve this problem, in the structure wherein, for lens position adjustment, the lens is moved in the direction perpendicular to optical axis alone, not in the direction of optical axis, it is required to design a lens capable of reducing the spot displacement in the direction of optical axis resulting from the lens movement in the direction perpendicular to optical axis.

Similarly, in the structure wherein the lens is moved by an actuator, as in the invention of JP-A No. 2003-338795, it is considered that the optical system for converging the light flux from the light source onto the end of the optical fiber or the waveguide of the SHG element is made up of two lenses—a lens for collimating the light source and a lens for coupling the collimated light to the waveguide, for example. These two lenses can be driven for correction by the actuator in the X direction perpendicular to the optical axis, and in the Y-direction perpendicular to the optical axis and X axis. This will be discussed in the following. Such a drive system will correct the spot displacement in the X direction and Y direction.

If the lens is displaced in the X direction or Y direction, focal position is shifted in the direction of optical axis due to the curvature on the image surface. However, when the lens is not driven in the direction of optical axis for the sake of simplification of the drive apparatus, the focal position is hardly adjusted by the curvature of image surface. Accordingly, it hardly control increase of the spot diameter and a part of the light will come off the edge of the fine waveguide of the SHG element or the end of the optical fiber, with the result that the coupling efficiency is reduced.

To put it more specifically, consider the case wherein correction is made by shifting the first lens on the semiconductor laser side in the X direction and the second lens of the SHG element in the Y direction. If the second lens alone is shift in the Y direction, misalignment in the Y direction occurs to the semiconductor laser, first lens and SHG element. In this case, even if the second lens is shifted in the Y direction for correction, the decentering error of the second lens in the Y direction remains uncorrected. In the optical system without the decentering error being corrected, the coupling efficiency will be deteriorated by the generation of aberration and the production yield rate will be reduced.

SUMMARY

The object of the present invention is to solve the aforementioned problems and to provide an optical coupling lens capable of minimizing the spot displacement in the direction of optical axis resulting from the movement of a lens in the direction perpendicular to optical axis, and to provide a light source module of simplified structure with the aforementioned optical coupling lens, which provides excellent coupling efficiency with respect to an optical waveguide, optical fiber or SHG element.

Preferably, the present invention is achieved in order to provide an optical coupling lens preferably capable of minimizing the deterioration of coupling efficiency despite a decentering error remaining uncorrected, and to provide a light source module of simplified structure with the aforementioned optical coupling lens, which provides excellent coupling efficiency with respect to an optical waveguide, optical fiber or SHG element.

The present invention provides an optical coupling lens for converging a light flux emitted from a light source to an entrance aperture, which satisfies a predetermined condition according to a third-order astigmatism coefficient of the optical coupling lens. Further, the present invention provides a light source module comprising: a light source; an optical waveguide; and an optical unit comprising one or more of an optical coupling lens for converging a light flux emitted from the light source onto the optical waveguide, in which at least one of the optical coupling lens satisfies a predetermined condition according to a third-order astigmatism coefficient of the optical coupling lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 23:
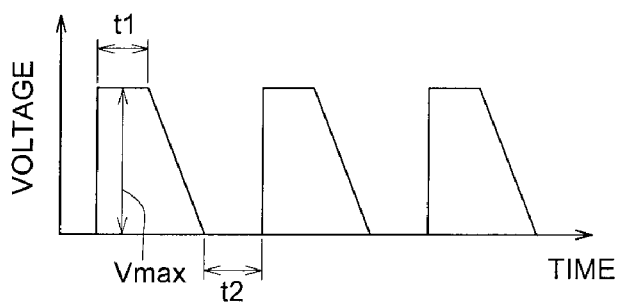
Figure 23:
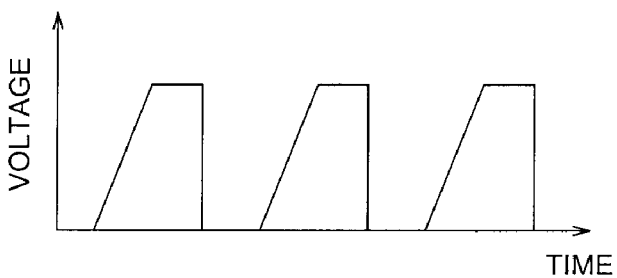
Figure 24:
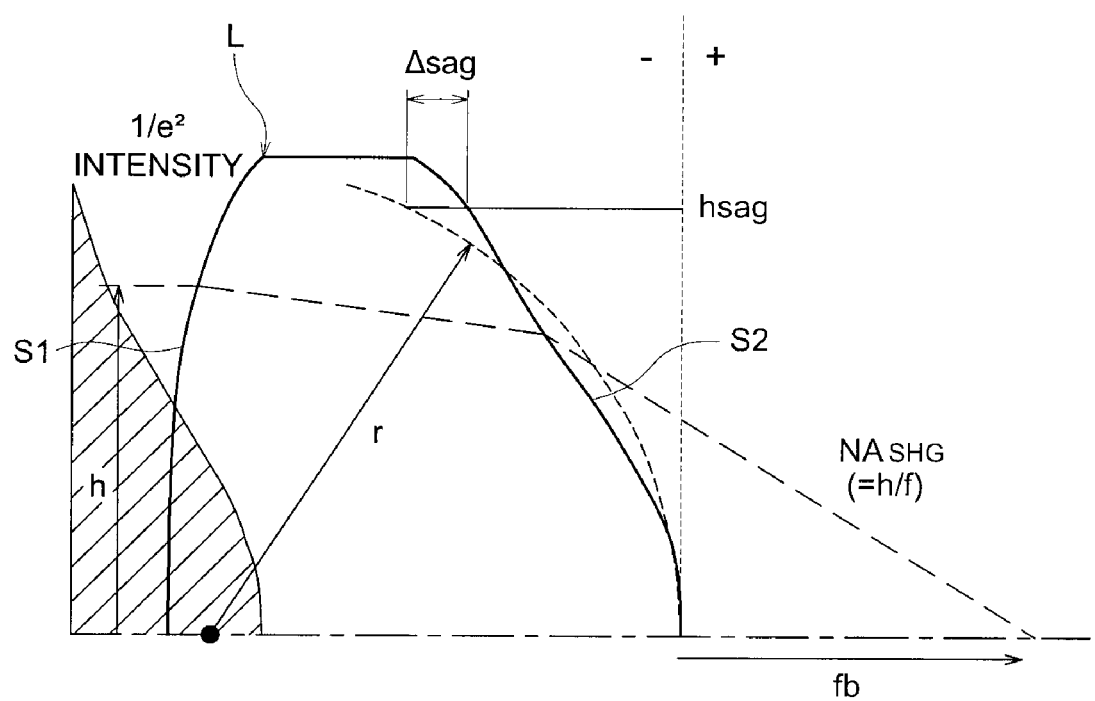
Figure 25:
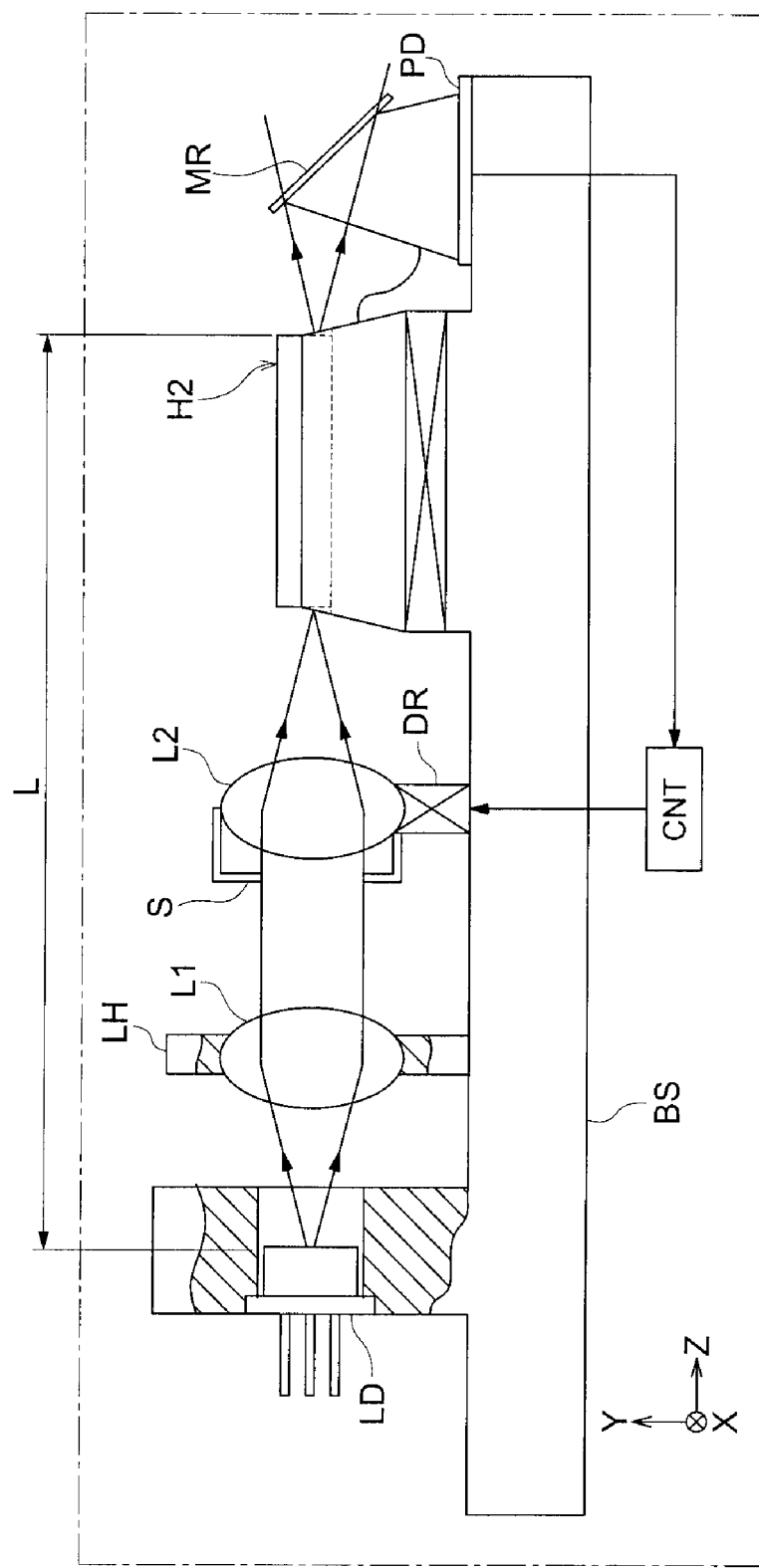
Figure 26:
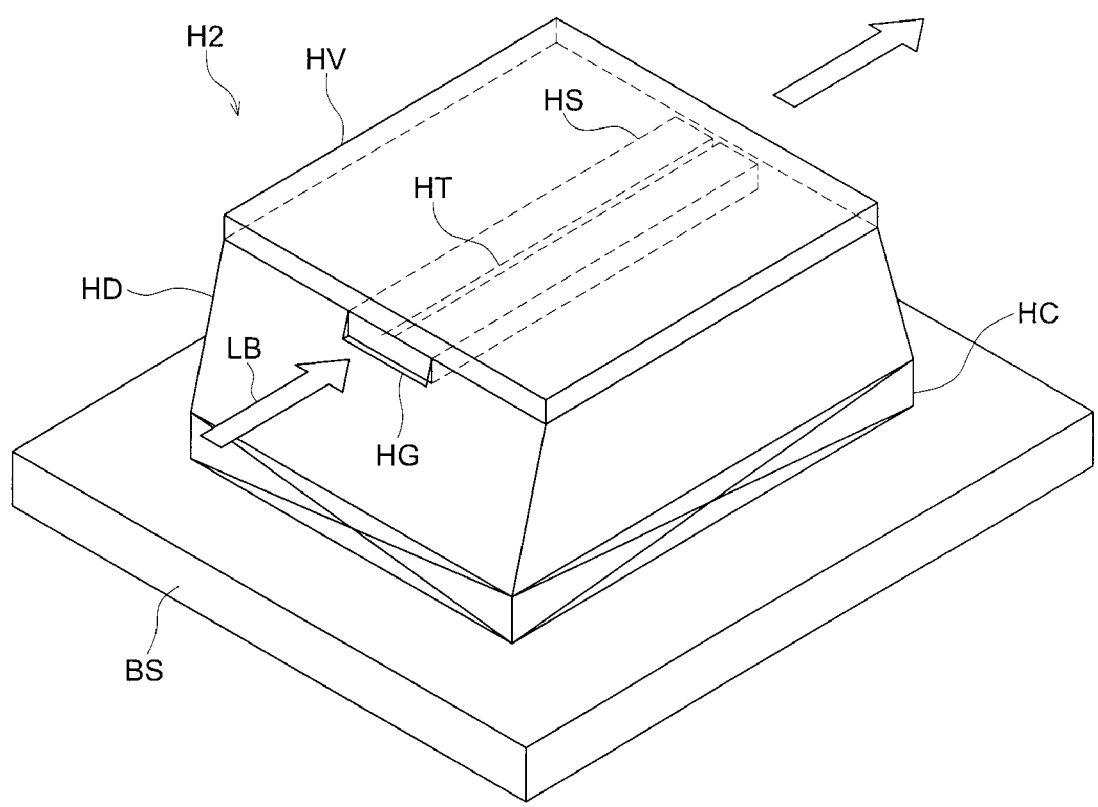
Figure 27:
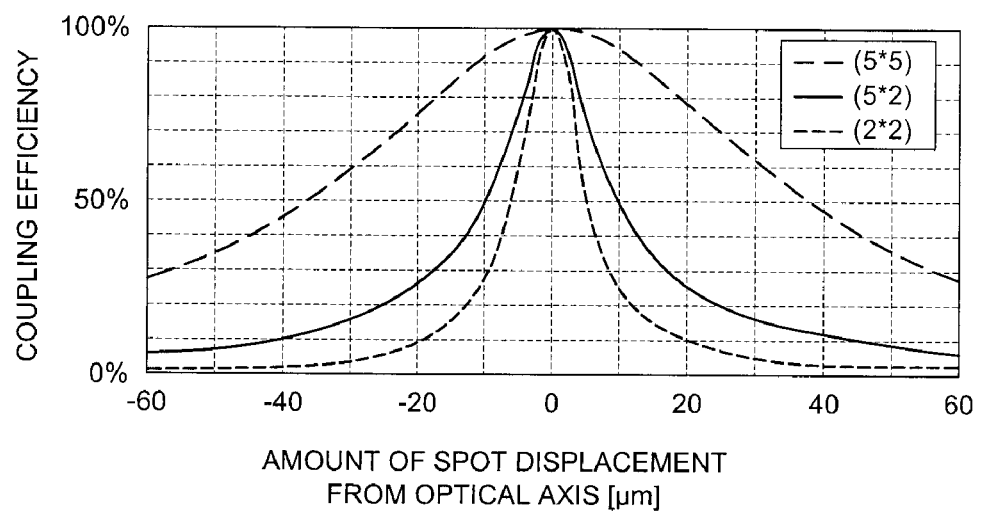
Figure 28:
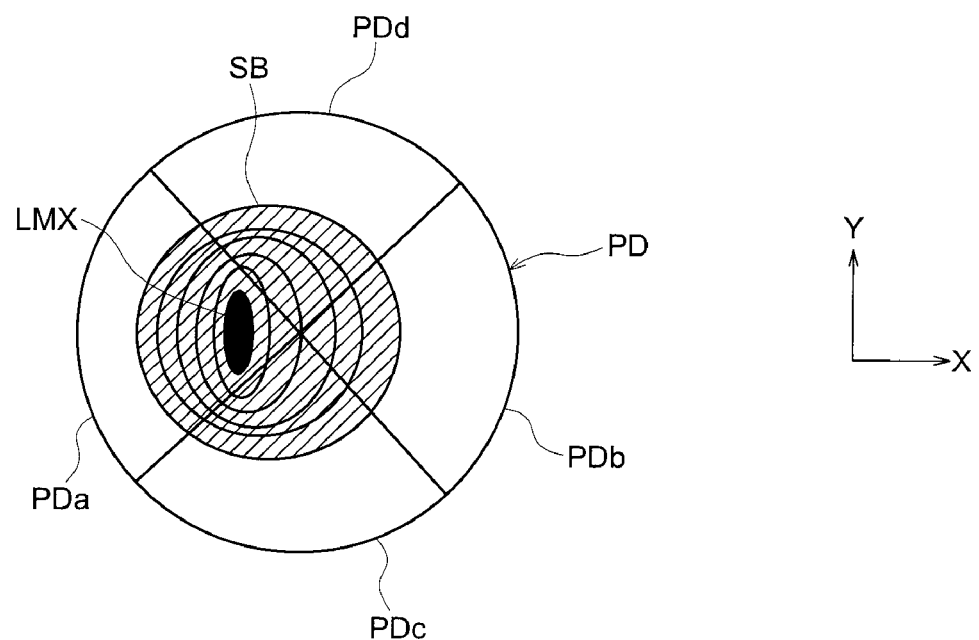
Figure 29:
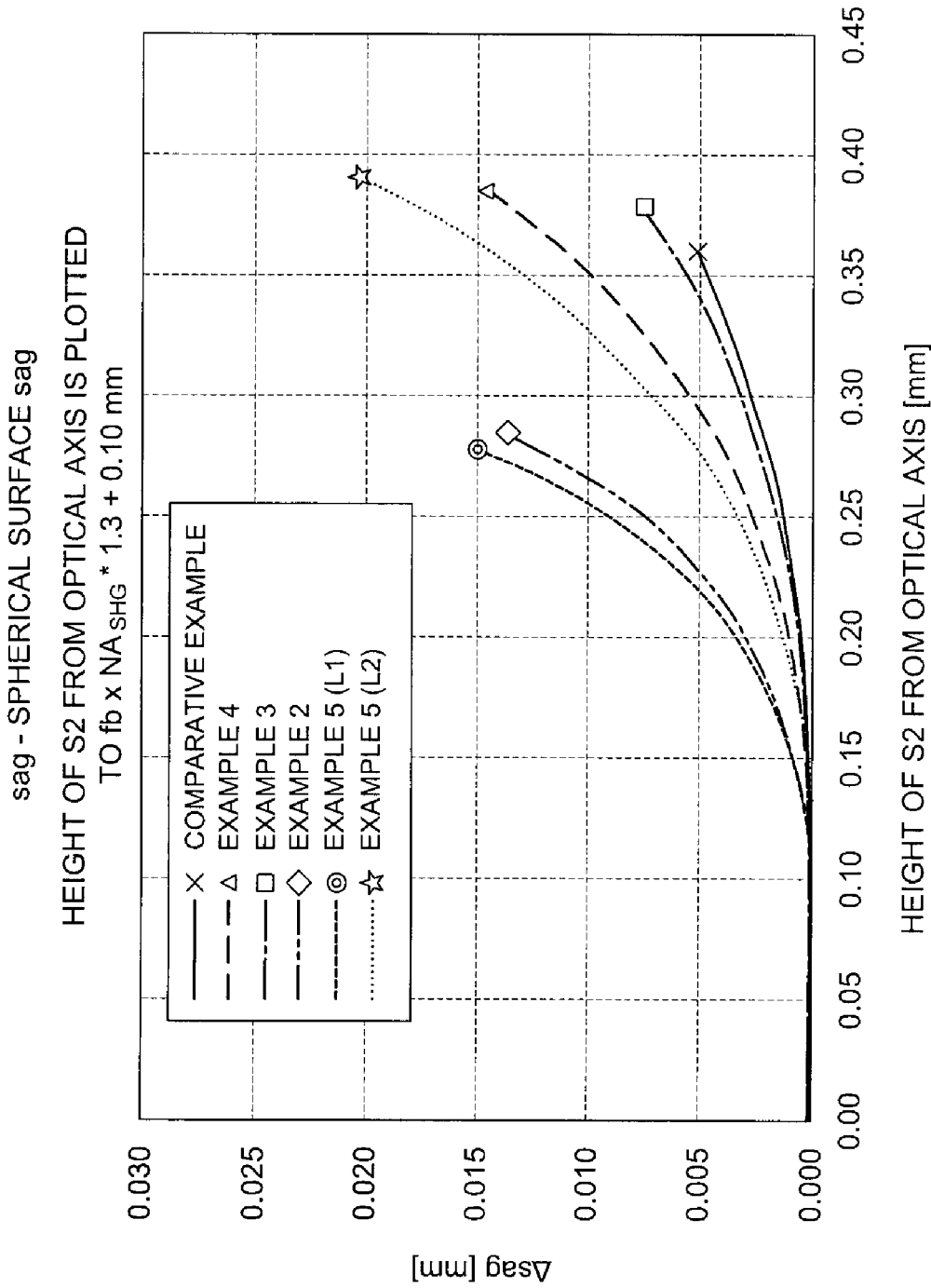
Figure 30:
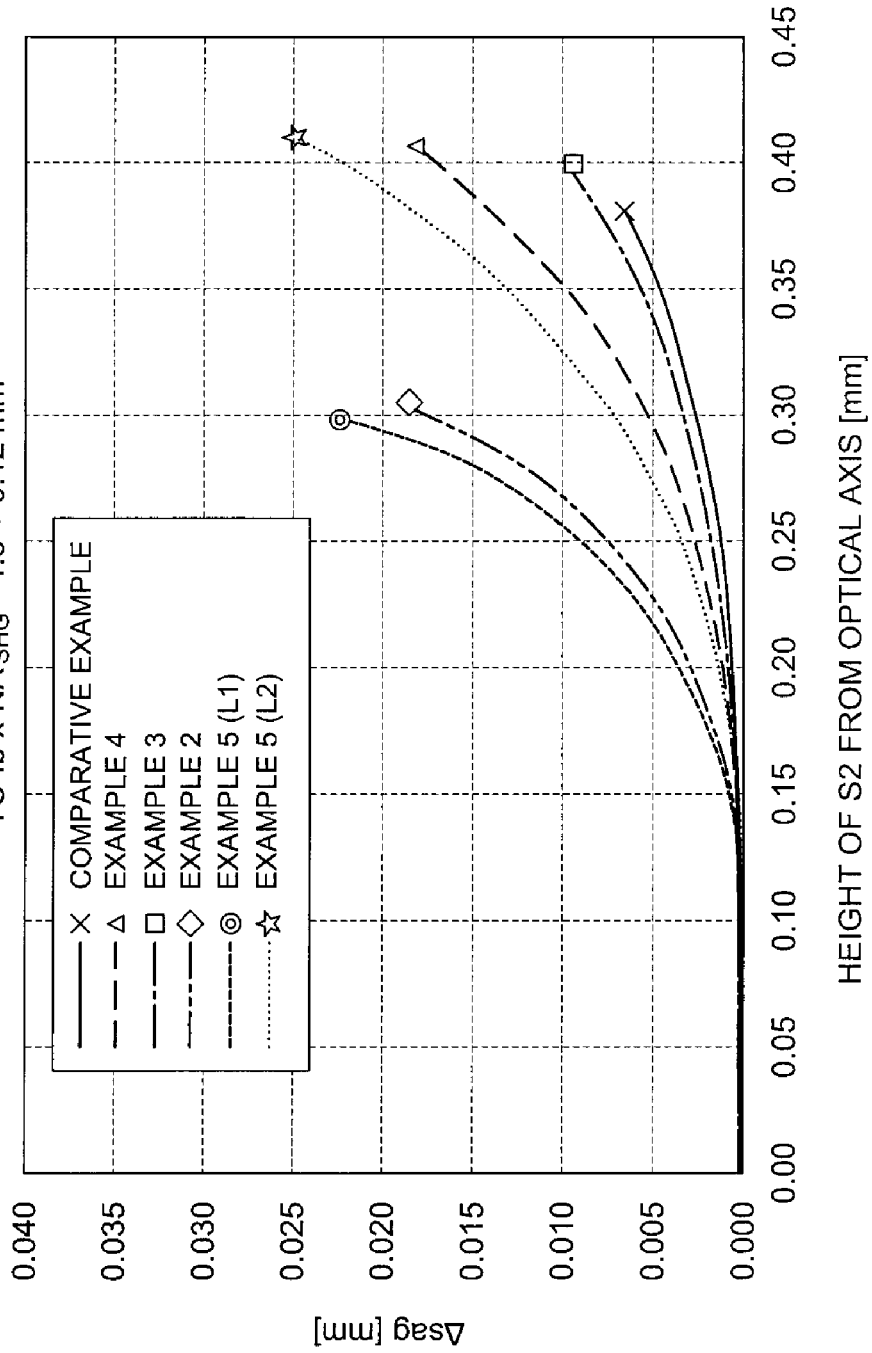

Each of FIGS. 23(a) and 23(b) is waveform diagrams showing the drive voltage pulse as an embodiment of the present invention;

FIG. 24 is a schematic diagram showing the cross section of a lens;

FIG. 25 is a schematic diagram showing the semiconductor light source module as an embodiment of the present invention;

FIG. 26 is a perspective view showing the second harmonic generation apparatus H2;

FIG. 27 is a chart showing an example of the coupling efficiency of the SHG element;

FIG. 28 is a diagram schematically showing the light receiving surface of the light receiving element PD;

FIG. 29 is a chart for Comparative Examples and Examples 1 through 4, wherein the height of the optical surface from the optical axis on the shorter conjugate distance side is plotted on the horizontal axis, and $\Delta_{sag}$ is plotted on the vertical axis, up to $h_{sag}$=fb×$NA_{SHG}$×1.3+0.10 mm; and FIG. 30 is a chart for Comparative Examples and Examples 1 through 4, wherein the height of the optical surface from the optical axis on the shorter conjugate length side is plotted on the horizontal axis, and $\Delta_{sag}$ is plotted on the vertical axis, up to $h_{sag}$=fb×$NA_{SHG}$×1.3+0.12 mm.

DESCRIPTION OF THE PREFERRED EMBODIMENT

The preferred embodiment of the present invention will be described below.

A first embodiment is an optical coupling lens for converging a light flux emitted from a light source to an entrance aperture, and the optical coupling lens satisfies a following expression.

$$0.04 < III < 0.30 \quad (8)$$

Where, III is a third-order astigmatism coefficient of the optical coupling lens.

Here the third-order an astigmatic aberration coefficient III is the value defined in Chapter 4, "Lens Design Procedure", MATSUI Yoshinari. It is a constant which is inherent to a lens and independent from the incoming diameter or incoming angle of view, and is defined as following expression (9).

$$\Delta y = -\frac{1}{2\alpha_k'}\{IR^3\cos\phi + II(N_1\tan\omega)R^2(2+\cos2\phi) + \quad (9)$$
$$(2III + IV)(N_1\tan\omega)^2 R\cos\phi + V(N_1\tan\omega)^3\}$$
$$\Delta z = -\frac{1}{2\alpha_k'}\{IR^3\sin\phi + II(N_1\tan\omega)R^2\sin2\phi + IV(N_1\tan\omega)^2 R\sin\phi\}$$

In the expression (9), each of $\Delta y$ and $\Delta z$ is defined as a displacement from an ideal image point on an image plane caused by the third-order aberration in an optical system, where the image plane extends on y-z coordinate system and an image height extends in the Y direction. In the expressions of $\Delta y$ and $\Delta z$, a position of ray of light on a principal plane at the object side is represented by a polar coordinate system (R, φ) in which the intersection of principal ray and the principal plane at the object side is defined as its origin. Further, ω represent a half angle of view which is an incident angle of the ray of light from an off-axis object point to a principal point at the object side, and $N_1$ represents a refractive index of the object space. In the expression (9), $\alpha_k'$ expresses a numerical aperture which becomes $N_k\alpha_k'$ when a refractive index of the image plane is $N_k$. Coefficients I, II, III, IV, and V represent aberration coefficients of comma, spherical aberration, astigmatism, curvature of the sagital image plane, and distortion, respectively, which are constants independent from the variables R, φ, and tan ω.

The present invention has an advantage of providing an optical coupling lens wherein the spot displacement in the direction of optical axis caused by the movement of the lens in the direction perpendicular to optical axis is reduced by keeping the third-order astigmatism coefficient III of the lens within a specific range; and the light source module with the optical coupling lens mounted thereon, which has a simple structure and excellent coupling efficiency with respect to the optical waveguide.

In the above embodiment, it is preferable that the optical coupling lens comprises an optical surface in an aspheric shape facing a side of the optical coupling lens providing shorter conjugate distance than an opposite side of the optical coupling lens. Then, the optical coupling lens preferably satisfies a following expressions.

$$6.5 \ \mu m < \Delta_{sag} < 30 \ \mu m \quad (1)$$

$$h_{sag} = fb \times NA_{SHG} \times 1.3 + 0.10 \ mm \quad (2)$$

$$NA_{SHG} = \alpha/f \quad (3)$$

Where, $h_{sag}$ is a height from an optical axis of the optical coupling lens, $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, α is a height from the optical axis at $1/e^2$ intensity point of an incident light flux to the optical coupling lens, and f is a focal length of the optical coupling lens.

FIG. 24 is a schematic diagram showing the cross section of a lens. Assume in this case that S1 denotes the optical surface of the lens L facing the longer conjugate distance side, and S2 indicates the optical surface facing the shorter conjugate distance side. The dotted line virtually shows the spherical shape having a local axial radius r. By providing the difference $\Delta_{sag}$ which is larger than the lower limit of the expression (1), the deterioration of the coupling efficiency can be reduced, even if the decentering error remains uncorrected, where $\Delta_{sag}$ denotes a positional difference at the height $h_{sag}$ between the optical surface as the aspheric shape and a spherical shape. By providing the difference $\Delta_{sag}$ which is smaller than the upper limit of the expression (1), the balance between the sagittal surface and meridional surface can be maintained. In the present Specification, when the light flux coming from the light source has an elliptical cross section, the "height from the optical axis" is defined to be assigned on the longer axis side.

Further, it is preferable that the difference $\Delta_{sag}$ satisfies the following expression (1').

$$8.0 \ \mu m < \Delta_{sag} < 27 \ \mu m \tag{1'}$$

When the focal length of the first lens is f1, that of the second lens is f2, and the numerical aperture of output of the light source at $1/e^2$ intensity point is $NA_{LD}$. Then the following relationship is obtained.

$$NA_{SHG} = f1/f2 \times NA_{LD} \tag{7}$$

In the above embodiment, alternatively, it is also preferable that the optical coupling lens, comprises an optical surface in an aspheric shape facing a side of the optical coupling lens providing shorter conjugate distance than an opposite side of the optical coupling lens, and the optical coupling lens satisfies a following expressions.

$$8 \ \mu m < \Delta_{sag} < 40 \ \mu m \tag{4}$$

$$h_{sag} = fb \times NA_{SHG} \times 1.3 + 0.12 \ mm \tag{5}$$

$$NA_{SHG} = \alpha/f \tag{6}$$

Where, $h_{sag}$ is a height from an optical axis of the optical coupling lens, $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, α is a height from the optical axis at $1/e^2$ intensity point of an incident light flux to the optical coupling lens, and f is a focal length of the optical coupling lens.

According to the present embodiment, when the difference $\Delta_{sag}$ is larger than the lower limit of the conditional expression (4), the deterioration of coupling efficiency can be reduced despite a decentering error remaining uncorrected. When it is smaller than the upper limit of the conditional expression (4), the balance between the sagittal and meridional image surfaces can be maintained. In the expression (1) and (4) for obtaining the height from the optical axis $h_{sag}$, the last term is provided for corresponding to a tolerance of displacement in the direction of optical axis of lenses with different specifications. The expressions (1) and (4) differ in their last terms of 0.10 mm and 0.12 mm, which define the difference $\Delta_{sag}$ at a different position.

Further, it is preferred to make sure that the difference $\Delta_{sag}$ satisfies the following expression (4')

$$12 \ \mu m < \Delta_{sag} < 37 \ \mu m \tag{4'}$$

In the above embodiment, the optical coupling lens may be used in a second harmonic generation apparatus. As for second harmonic generation apparatus, there is an apparatus utilizing a domain-inverted element.

In the above embodiment, the optical coupling lens may be used in an optical transmitting and receiving apparatus. An example of an optical transmitting and receiving apparatus is an apparatus which transmits and/or receives light through an optical fiber, and it also includes an apparatus just transmitting light and an apparatus just receiving light.

Another embodiment of the present invention is a light source module comprising: a light source; an optical waveguide; and an optical unit comprising one or more of an optical coupling lens for converging a light flux emitted from the light source onto the optical waveguide, wherein at least one of the optical coupling lens satisfies the following expression (8).

$$0.04 < III < 0.30 \tag{8}$$

Where, III is a third-order astigmatism coefficient of the optical coupling lens.

In the above embodiment, the light source module may further comprise an actuator moving the optical coupling lens satisfying the following expression only in a direction perpendicular to an optical axis of the optical coupling lens, for adjusting a coupling efficient to the waveguide.

$$0.04 < III < 0.30 \tag{8}$$

In the above embodiment, it is preferable that the optical coupling lens satisfying the expression (8) comprises an optical surface in an aspheric shape facing a side of the optical coupling lens providing shorter conjugate distance than an opposite side of the optical coupling lens, wherein the optical coupling lens satisfies a following expressions.

$$6.5 \ \mu m < \Delta_{sag} < 30 \ \mu m \tag{1}$$

$$h_{sag} = fb \times NA_{SHG} \times 1.3 + 0.10 \ mm \tag{2}$$

$$NA_{SHG} = \alpha/f \tag{3}$$

Where $h_{sag}$ is a height from an optical axis of the optical coupling lens, $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, α is a height from the optical axis at $1/e^2$ intensity point of an incident light flux to the optical coupling lens, and f is a focal length of the optical coupling lens.

Further, it is more preferable that the difference $\Delta_{sag}$ satisfies the following expression (1').

$$8.0 \ \mu m < \Delta_{sag} < 27 \ \mu m \tag{1'}$$

When the focal length of the first lens is f1, that of the second lens is f2, and the numerical aperture of output of the light source at $1/e^2$ intensity point is $NA_{LD}$. Then the following relationship is obtained.

$$NA_{SHG} = f1/f2 \times NA_{LD} \tag{7}$$

In the above embodiment, alternatively, it is preferable that the optical coupling lens satisfying the expression (8) comprises an optical surface in an aspheric shape facing a side of the optical coupling lens providing shorter conjugate distance than an opposite side of the optical coupling lens, wherein the optical coupling lens satisfies a following expressions.

$$8 \, \mu m < \Delta_{sag} < 40 \, \mu m \quad (4)$$

$$h_{sag} = fb \times NA_{SHG} \times 1.3 + 0.12 \, mm \quad (5)$$

$$NA_{SHG} = \alpha/f \quad (6)$$

Where, $h_{sag}$ is a height from an optical axis of the optical coupling lens, $\Delta_{sag}$ is a difference at the height $h_{sag}$ between the aspheric shape and a spherical shape arranged at a same position on the optical axis to the aspheric shape and having a predetermined local axial radius, fb is a back focus of the optical coupling lens, $\alpha$ is a height from the optical axis at $1/e^2$ intensity point of an incident light flux to the optical coupling lens, and f is a focal length of the optical coupling lens.

According to the present embodiment, when the difference $\Delta_{sag}$ is larger than the lower limit of the conditional expression (4), the deterioration of coupling efficiency can be reduced despite a decentering error remaining uncorrected. When it is smaller than the upper limit of the conditional expression (4), the balance between the sagittal and meridional image surfaces can be maintained. In the expression (1) and (4) for obtaining the height from the optical axis $h_{sag}$, the last term is provided for corresponding to a tolerance of displacement in the direction of optical axis of lenses with different specifications. The expressions (1) and (4) differ in their last terms of 0.10 mm and 0.12 mm, which define the difference $\Delta_{sag}$ at a different position.

Further, it is preferred to make sure that the difference $\Delta_{sag}$ satisfies the following expression (4').

$$12 \, \mu m < \Delta_{sag} < 37 \, \mu m \quad (4')$$

In the above embodiment, the optical unit may comprise two optical coupling lenses. By employing plural lenses in the optical unit, it protects the light source module from deterioration in coupling due to an aberration caused when the lens is driven and adjusted. This may decrease sensitivity in the lens drive and adjustment.

In the above embodiment, it is preferable that at least one optical coupling lens in the optical unit is a collimation lens. It ensures enough tolerance for decentering of the lens in excellent condition.

In the above embodiment, wherein each optical coupling lens in the optical unit may be a glass lens. By utilizing a glass lens, it can control the focus shift due to temperature. It does not require a lens movement in the optical axis direction for its correction even when the temperature changes, therefore, the structure of the light source module can be simplified.

In the above embodiment, the optical unit may comprise an optical coupling lens facing the light source and an optical coupling lens facing the optical waveguide, which are in a same shape. In this case, the expression (7) leads the expression $NA_{SHG} = NA_{LD}$.

In this specification, "optical coupling lens are in the same shape" means that the lenses are the same in curvature radius, thickness, and astigmatism coefficient, or in the lens shape within an effective aperture, where the lenses can be arranged with facing opposing direction to each other.

In the above embodiment, the light source module may further comprises a drive device for driving the at least one of the optical coupling lens in a direction perpendicular to the optical axis.

In the above embodiment, the optical waveguide may be a second harmonic generation element or an optical fiber.

Referring to drawings, the following describes the preferred embodiments of the present invention. FIG. 25 is a schematic diagram representing an example of the semiconductor light source including the optical element unit relating to the present invention. In FIG. 25, the base BS includes a semiconductor laser LD as a semiconductor light source; a lens L1 facing the side of the semiconductor laser LD having a positive refractive power; a second harmonic generation (SHG) apparatus H2 wherein an optical waveguide is formed; a half mirror MR that reflects only a part of the light and transmits the rest of the light; and a light receiving element PD that receives the light reflected from the half mirror MR and sends a signal to the control circuit CNT in response to the amount of light having received, wherein these components are installed on a stationary basis. In response to the signal of the control circuit CNT, the drive mechanism (also called the drive device) DR on the base BS moves the lens L2 on the side of the second harmonic generation apparatus H2 and the aperture stop S in the X- or Y-axis direction which is perpendicular to the optical axis to make adjustment in such a way as to enhance the efficiency of coupling with the optical waveguide. The lens L2 is moved by the actuator only in the directions X and Y perpendicular to the optical axis Z. There is no actuator that moves the lenses L1 and L2 in the direction of optical axis Z. In this structure, the lens L1 and lens L2 constitute the optical element unit. FIG. 25 shows the Cartesian coordinates for three axes X, Y and Z, wherein the optical axis extends along the Z axis and the X axis extends in the direction perpendicular to the sheet of the figure.

An arbitral structure can be used to design the X-axis actuator and Y-axis actuator if only the position can be adjusted such a way that the spot on the optical waveguide incoming end 5a is moved in the X-axis and Y-axis direction. For example, the first lens L1 can be moved only in the X-axis direction and the second lens L2 can be moved only in the Y-axis direction; each of the first lens L1 and second lens L2 can be moved in the X- and Y-axis directions; or one of the first lens L1 and second lens L2 is fixed and the other can be moved in the X- and Y-axis directions. Namely, any desired structure can be employed. It should be noted that the direction in which the X-axis actuator is movable need not necessarily be perpendicular to that in which the Y-axis actuator is movable.

As an example, the lenses L1 and L2 is equipped with a drive mechanism that serves as an actuator. The lens L2 is moved by the actuator only in the directions X and Y perpendicular to the optical axis Z. There is no actuator that moves the lenses L1 and L2 in the direction of optical axis Z. The lenses L1 and L2 are moved in the X- and Y-axis direction by this actuator, and adjustment is made in such a way as to enhance the efficiency of coupling with the optical waveguide.

In the present embodiment, a glass lens is used as the optical coupling lens. In the present embodiment, the number of the optical coupling lenses is 2. The collimation lenses in the same shape are used as the first lens L1 mounted to face with the laser-diode LD and the second lens L2 mounted to face with the optical waveguide, which are arranged to face opposing directions.

When III denotes the third-order astigmatic coefficient of the optical coupling lens used in the present embodiment, the following relationship holds:

$$0.04 < III < 0.30 \quad (8)$$

When the III is kept within this range, it is possible to control the spot displacement in the direction of optical axis resulting from the shift of the lens position in the direction perpendicular to optical axis. Thus, even in a simple structure wherein there is no mechanism for moving the lens in the Z-axis direction, it is possible to control the spot displacement in the direction of optical axis Z resulting from the adjustment of the lens position in the X- and Y-axis directions. A high coupling efficiency can be achieved by mere adjustment of the lens position adjustment in the X- and Y-axis directions.

In this case, the optical surface of the lens 1 on the semiconductor laser LD side and the optical surface of the lens 2 on the second harmonic generation apparatus H2 side can have the same aspherical shape. Here the following expressions are preferably satisfied when "$\Delta_{sag}$" is a positional difference at the height $h_{sag}$ which is a height from an optical axis of the optical coupling lens between the aspheric shape and a spherical shape arranged at a same position on the optical axis to the aspheric shape and having a predetermined local axial radius.

$$6.5 \ \mu m < \Delta_{sag} < 30 \ \mu m \tag{1}$$

$$h_{sag} = fb \times NA_{SHG} \times 1.3 + 0.10 \ mm \tag{2}$$

$$NA_{SHG} = \alpha/f \tag{3}$$

Where, fb is a back focus of the optical coupling lens, $\alpha$ is a height from the optical axis at $1/e^2$ intensity point of an incident light flux to the optical coupling lens, and f is a focal length of the optical coupling lens.

Alternatively, the following expressions are preferably satisfied when "$\Delta_{sag}$" is a positional difference at the height $h_{sag}$ which is a height from an optical axis of the optical coupling lens between the aspheric shape and a spherical shape arranged at a same position on the optical axis to the aspheric shape and having a predetermined local axial radius.

$$8 \ \mu m < \Delta_{sag} < 40 \ \mu m \tag{4}$$

$$h_{sag} = fb \times NA_{SHG} \times 1.3 + 0.12 \ mm \tag{5}$$

$$NA_{SHG} = \alpha/f \tag{6}$$

Where, fb is a back focus of the optical coupling lens, $\alpha$ is a height from the optical axis at $1/e^2$ intensity point of an incident light flux to the optical coupling lens, and f is a focal length of the optical coupling lens.

FIG. 26 is a perspective view representing the second harmonic generation apparatus H2. As shown in FIG. 26, the second harmonic generation apparatus H2 includes a thermoelectric cooling apparatus HC mounted on the base BS; an optical waveguide type SHG element HS for generating the second harmonic of the laser beam converged by the lens L2 and emitted to one end of the optical waveguide (also called the optical transmission line) HT; a support member HD for supporting the optical waveguide type SHG element HS; and a cover HV for covering the support member HD supporting the optical waveguide type SHG element HG. A groove HG for mounting the optical waveguide type SHG element HS is formed on the support member HD.

The optical waveguide type SHG element HS uses the non-linear optical crystal to convert the light passing through the optical waveguide HT into the second harmonic to be outputted. This technique is disclosed in JP-A No. 2003-338795, and is commonly known. Accordingly, the details of this technique will not be described. The diameter of the entrance aperture of the optical waveguide HT is 1 μm or more without exceeding 15 μm.

FIG. 27 is a chart representing the relationship between the spot displacement in the direction of optical axis and the coupling efficiency of the SHG element. Generally, the amount of laser beam has a Gaussian distribution whose center exhibits the maximum level. Thus, if there is no agreement in the centers between the principal ray of the laser light flux and the optical transmission line of the SHG element, the coupling efficiency is reduced. When there is agreement in the centers between the principal ray of the laser light flux and the optical transmission line of the SHG element, the coupling efficiency is defined as 100%. If the spot has been displaced in the direction of optical axis, the coupling efficiency will be reduced, as shown in FIG. 27. However, the degree in the reduction of the coupling efficiency varies according to the size of the entrance aperture of the optical transmission line. When the entrance aperture has a size of 5 μm×5 μm, the displacement of the optical axis of the spot by 10 μm reduces the coupling efficiency just to 93%. When the entrance aperture has a size of 5 μm×2 μm, the displacement of the optical axis of the spot by 10 μm reduces the coupling efficiency to 50%. Further, when the entrance aperture has a size of 2 μm×2 μm, the displacement of the optical axis of the spot by 10 μm reduces the coupling efficiency to 26%. This demonstrates the need of minimizing the spot displacement in the direction of optical axis.

The following describes the operation of the semiconductor light source module in the present embodiment. If the laser beam having a wavelength λ is emitted from the semiconductor laser LD, such a laser beam is converted into a approximately parallel light flux by the first lens L1. After passing through the aperture stop S, the light flux is converged by the second lens L2, and enters the optical transmission line of the second harmonic generation apparatus H2. Here the light flux is converted into a second harmonic. Namely, the converted light flux having half the wavelength (λ/2) is emitted from the second harmonic generation apparatus H2. Then, part of the converted light flux is reflected by the half mirror MR. The rest of the light is emitted to the outside.

The light flux having been converted by the half mirror MR enters the light receiving surface of the light receiving element PD. Here the center of the light receiving surface of the light receiving element PD corresponds to the center of the optical transmission line. Thus, when the principal ray of the incident light flux has passed through the center of the optical transmission line, the center of the spot light SB whose image is formed on the light receiving surface agrees with that of the light receiving surface, whereby the coupling efficiency is maximized. By contrast, if the principal ray of the incident light flux does not pass through the center of the optical transmission line, the center of the spot light SB fails to agree with that of the light receiving surface, as shown in FIG. 28. Thus, the lens L2 is driven to bend the optical axis of the principal ray of the incident light flux or to cause parallel movement so that the center of the spot light SB agrees with that of the light receiving surface.

The control mode can be described more specifically as follows. In the status shown in FIG. 28, the amount of the light received by the light receiving section PD can be seen as the greater. The control circuit CNT drives the drive apparatus DR, and drives the lens L2 in the X-axis direction. In response thereto, the light intensity peak area LMX of the spot light SB moves so as to increase the amount of the light received by the light receiving section PDb. When the amount of the light received by the light receiving section PDa is approximately the same as that of the light received by the light receiving section PDb, the drive apparatus DR is stopped so that the lens L2 is stopped. Under this condition, if there is any difference between the amount of the light received by the light receiving section PDc and that of the light received by the light receiving section PDd, the lens L2 is driven in the Y-axis direction so that there will be almost no difference. Then the light intensity peak area LMX of the spot light SB is moved accordingly. Thus, if the amount of light received by the light receiving section PDa becomes almost the same as that light received by the light receiving section PDb, and the amount of light received by light receiving section PDc becomes almost the same as that of light received by the light receiving section PDd, it can be seen that the light intensity peak area LMX of the spot light SB has agreed with the center of the light receiving surface. It is preferred that the lens L2 should not be driven if the light receiving element PD is in the process of detecting the amount of light received for the purpose of enhancing the detection precision.

In this case, the position of the beam waist is changed by the shift of the lens L2 in the direction perpendicular to the optical axis, and the focus position is shifted in the direction of optical axis, as compared to the position prior to shift. However, as described above, at least one of the lenses L1 and L2 meets the expression (8). Thus, this arrangement reduces the spot displacement in the direction of optical axis resulting from the shift of the lens position in the direction perpendicular to optical axis. Of the lenses L1 and L2, the one meeting the expression (8) may further meet the expression (1) or expression (4). In this case, deterioration of coupling efficiency can be reduced, despite the decentering error remaining uncorrected.

Figure 21:
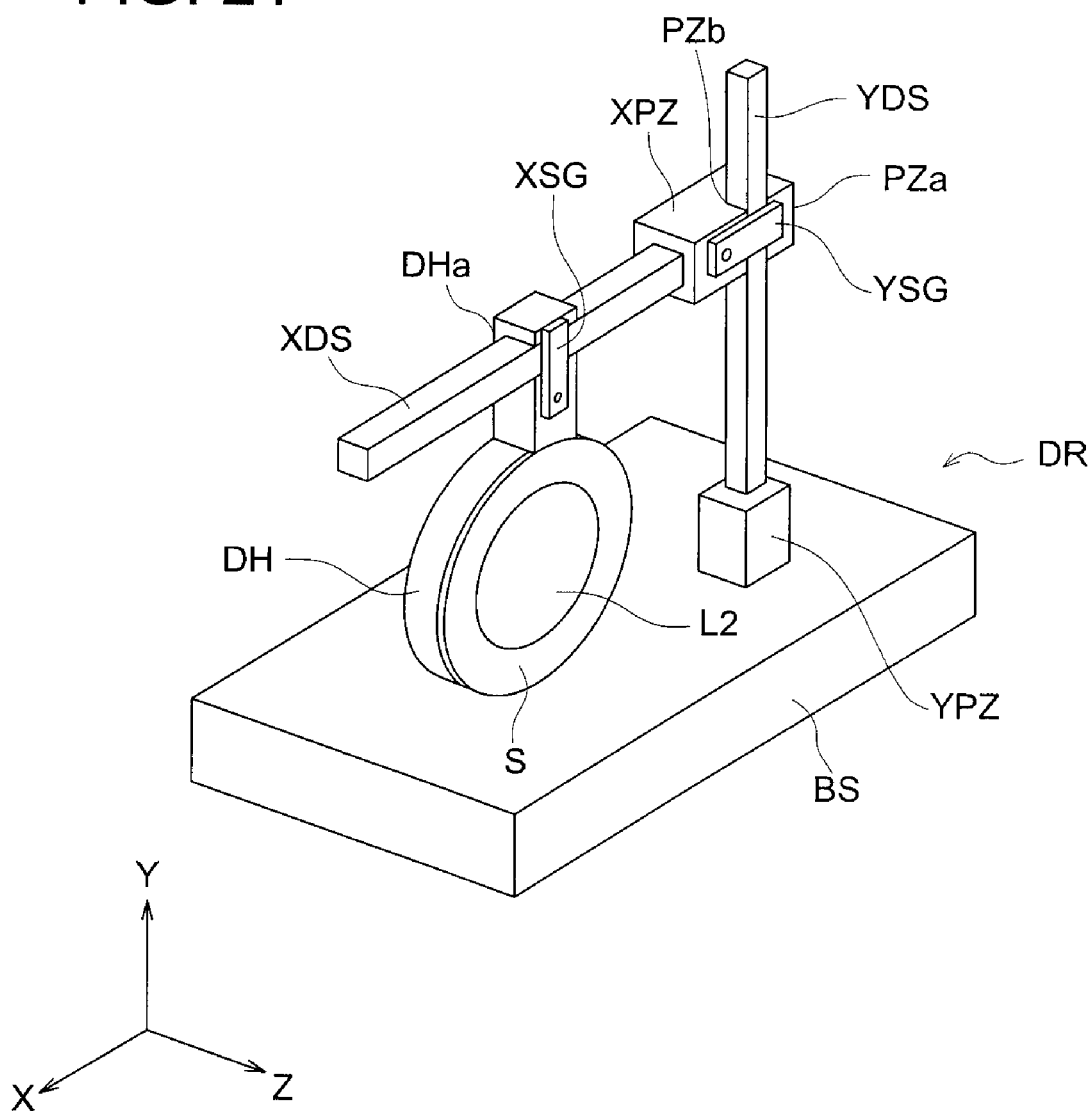
FIG. 21 is a perspective view of a lens drive apparatus as an embodiment of the present invention.
Figure 22:
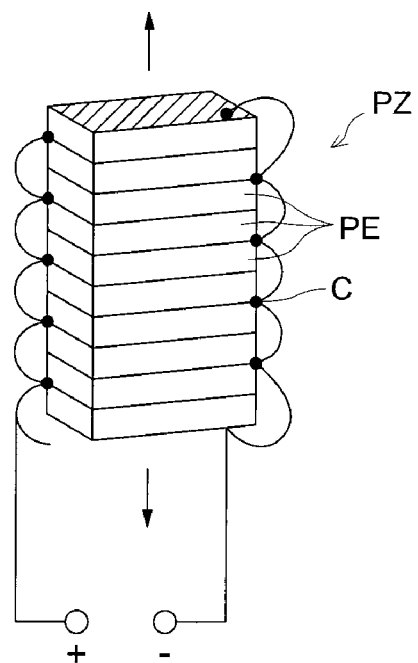
FIG. 22 is a perspective view of a laminate type piezoelectric actuator as an embodiment of the present invention.

The following describes an example of the actuator structure. FIG. 21 is a perspective view of the drive apparatus DR. The lens L2 and aperture stop S are held by the lens holder DH, and can be moved together as one integral member. The lens holder DH which is a movable member has a coupling section DHa for receiving the drive force.

The coupling section DHa includes a square groove DHb that is shaped to conform to a quadrangular column-like X-axis drive shaft XDS and is in contact therewith. Further, a plate spring XSG is mounted between the coupling section DHa and square groove DHb so as to sandwich the X-axis drive shaft XDS. The X-axis drive shaft XDS as a drive member sandwiched between the coupling section DHa and plate spring XSG extends in the direction (X-axis direction) perpendicular to the optical axis of the lens L2, and an adequate pressure is applied to it by the energizing force of the plate spring XSG. One end of the X-axis drive shaft XDS is a free end, and the other end is connected to the X-axis piezoelectric actuator XPZ as an electromechanical conversion element. The X-axis piezoelectric actuator XPZ has a coupling section PZa.

The coupling section PZa includes a square groove PZb that is shaped to conform to a quadrangular column-like Y-axis drive shaft YDS and is in contact therewith. Further, a plate spring YSG is mounted between the coupling section PZa and square groove PZb so as to sandwich the Y-axis drive shaft YDS. The Y-axis drive shaft YDS as a drive member sandwiched between the coupling section DHa and plate spring YSG extends in the direction perpendicular to the optical axis of the lens L2 and the X axis, and an adequate pressure is applied to it by the energizing force of the plate spring YSG. One end of the Y-axis drive shaft YDS is a free end, and the other end is connected to the Y-axis piezoelectric actuator YPZ as an electromechanical conversion element. The Y-axis piezoelectric actuator YPZ is mounted on the base BS. The piezoelectric actuators XPZ and YPZ, drive shafts XDS and YDS, coupling sections DHa and PZa, and plate springs XSG and YSG constitute the drive apparatus DR.

Figure 5:
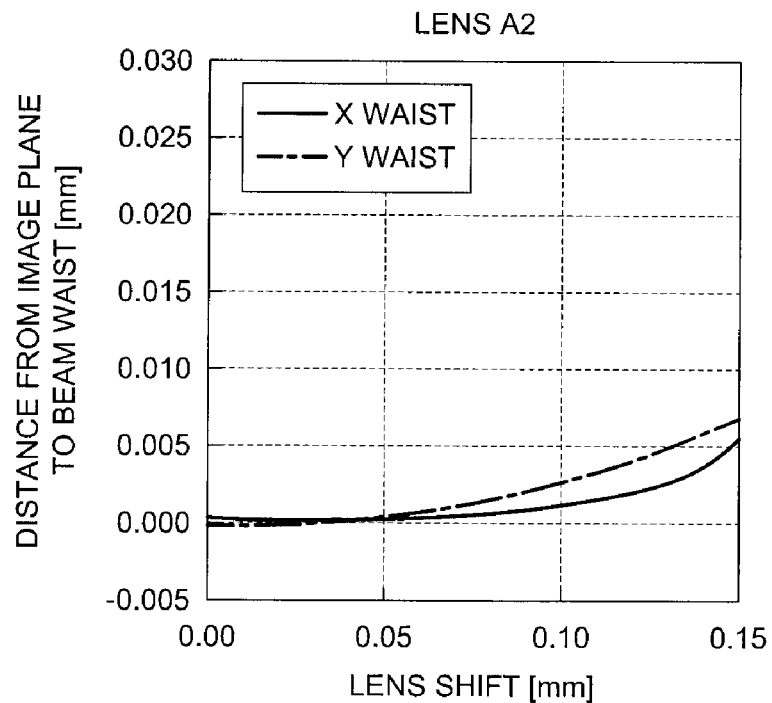
FIG. 5 is a chart showing a change in the distance from the image surface to the beam waist with respect to the shift of the first lens L1 in the X-axis direction when the lenses A2 are used as the first lens L1 and second lens L2.

The piezoelectric actuators XPZ and YPZ are formed of the laminated piezoelectric ceramics made of PZT (lead zirconate titanate) and others. In the piezoelectric ceramic, the center of gravity of the positive charge within the crystal lattice does not agree with that of the negative charge. The piezoelectric ceramic per se is polarizable. When voltage is applied in the direction of polarization, the piezoelectric ceramic stretches. However, the distortion of piezoelectric ceramic in this direction is very small, and the driven member is hardly driven by this distortion. Thus, a plurality of piezoelectric ceramics PE are heaped on top of one another, and the electrodes C are connected in parallel among these ceramics, whereby a laminate type piezoelectric actuator is produced, as shown in FIG. 5. This actuator has been proposed as a practicable product. The present embodiment uses this laminate type piezoelectric actuator PZ as a drive source.

The following describes the method of driving the lens L2. Generally, the displacement of the laminate type piezoelectric actuator is small when voltage is applied, but this actuator is characterized by great generation force and sharp response. Thus, when the pulse voltage of approximately sawtooth waveform characterized by sharp rise and gradual fall is applied to the piezoelectric actuator XPZ, as shown in FIG. 26(a), the piezoelectric actuator XPZ stretches rapidly at the rise of the pulse and shrinks more slowly at the time of fall. Thus, when the piezoelectric actuator XPZ stretches, the X-axis drive shaft XDS is pushed out forward in FIG. 21 by the impact thereof. However, the coupling section DHa of the lens holder DH and the plate spring XSG sandwiching the lens L2 do not move together with the X-axis drive shaft XDS due to the inertia thereof. A slide with X-axis drive shaft XDS occurs in-between, and they stay in that position (or may move just a little in some cases). In the meantime, at the time of fall of the pulse, the X-axis drive shaft XDS returns more slowly than at the time of rise. Without slipping with respect to the X-axis drive shaft XDS, the coupling section DHa and plate spring XSG move backward in FIG. 21 integrally with the X-axis drive shaft XDS. To put it another way, the lens holder DH for holding the lens L2 and aperture stop S can be moved on a continuous basis in the X-axis direction at a desired speed by application of the pulse with the frequency set at a few hundred Hertz through tens of thousands of Hertz. As is apparent from the above, the lens holder DH can be moved in the reverse direction by application of the voltage characterized by gradual rise and sharp fall, as shown in FIG. 26(b). In the present embodiment, the X-axis drive shaft XDS is formed in a quadrangular column (locking mechanism). Thus, the locking function of the lens holder DH is performed and tilting of the lens L2 is reduced, thereby eliminating the need of installing a separate guide shaft.

Similarly, when the pulse voltage of approximately sawtooth waveform characterized by sharp rise and gradual fall is applied to the piezoelectric actuator YPZ, as shown in FIG. 26(a), the piezoelectric actuator YPZ stretches rapidly at the rise of the pulse and shrinks more slowly at the time of fall. Thus, when the piezoelectric actuator YPZ stretches, the Y-axis drive shaft YDS is pushed out upward in FIG. 21 by the impact thereof. However, the coupling section PZa of the piezoelectric actuator XPZ and the plate spring YSG do not move together with the Y-axis drive shaft YDS due to the inertia thereof. A slide with Y-axis drive shaft YDS occurs in-between, and they stay in that position (or may move just a little in some cases). In the meantime, at the time of fall of the pulse, the Y-axis drive shaft YDS returns more slowly than at the time of rise. Without slipping with respect to the Y-axis drive shaft YDS, the coupling section PZa and plate spring YSG move downward in FIG. 21 integrally with the Y-axis drive shaft YDS. To put it another way, the piezoelectric actuator XPZ together with the lens holder DH can be moved on a continuous basis in the Y-axis direction at a desired speed by application of the pulse with the frequency set at a few hundred Hertz through tens of thousands of Hertz. As is apparent from the above, the piezoelectric actuator XPZ together with the lens holder DH can be moved in the reverse direction by application of the voltage characterized by gradual rise and sharp fall, as shown in FIG. 26(b). In the present embodiment, the Y-axis drive shaft YDS is formed in a quadrangular column (locking mechanism). Thus, the locking function of the piezoelectric actuator XPZ is performed and tilting of the lens L2 is reduced, thereby eliminating the need of installing a separate guide shaft.

EXAMPLES

The following describes the Examples in comparison with the Comparative Examples. In the following description including the lens data in Table, the exponent of 10 (e.g., $2.5\times10^{-3}$) will be expressed using E (e.g., 2.5E-3).

The optical coupling lens used in the Examples of the present invention and Comparative Examples uses the optical element made of one of the lenses A1 through A6 and lens B. The lens data of each optical element is given in Tables 2 through 7. The optical surface of the optical system in the Examples is formed on the aspherical surface axially symmetric about the optical axis, which is defined by the formula obtained by substituting the coefficient of the Table into expression (10).

$$Z(h) = \frac{h^2/r}{1 + \sqrt{1 - (1+k)(h/r)^2}} + \sum_{i=2} A_{2i} h^{2i} \quad (10)$$

wherein:

Z(h): Aspherical shape (distance in the direction of optical axis from the vertex of surface of the aspherical surfacer wherein the traveling direction of light is defined as positive)

h: Height in the direction perpendicular to optical axis ($h=(X^2+y^2)^{1/2}$ wherein x and y denote the distances from the optical axis, in the direction perpendicular to each other inside the plane perpendicular to the optical axis)

r: Curvature radius (on-axis local radius)

k: Conic coefficient $A_{2i}$: Aspherical surface coefficient

Table 2 shows the lens data of the Comparative Example that can be used in the embodiment of FIG. 25. Table 3 shows the lens data of Example 1, Table 4 shows the lens data of Example 2, Table 6 shows the lens data of Example 3, and Table 7 shows the lens data of Example 5. Further, in Examples 1 through 4 and Comparative Examples, the first lens L1 and second lens L2 are any of the lenses A1 through A4 and lens B. In Example 5, the first lens L1 is the lens AS, and the second lens L2 is the lens A5. Based on this arrangement, values in these examples are calculated. When the displacement of the lens L2 or SHG element in the direction of optical axis is to be corrected by shifting the lens L1 in the direction perpendicular to the optical axis (X and Y), the tolerance in Tables 2 through 7 indicates the limit value wherein the coupling efficiency is not reduced below 90%. Further, the $\Delta_{sag}$ defines the positional difference at the height $h_{sag}$ (corresponding to the expressions (2) and (5)) on the optical axis between the second and sixth optical surfaces having a spherical shape as the optical surface on the shorter conjugate length side, and the spherical shape whose optical axial position conforms to that of the aspherical surface and wherein the on-axis local radius (corresponding to r in the expression 10) of the aspherical surface is a radius.

Table 1 shows the numerical values for the third-order astigmatism coefficient III of six lenses A1 through A6 and one lens B. As shown in Table 1, the values of III for six lens A1 through A6 lie within the range of 0.04<III<0.30. The value for III of one lens B is outside the range of 0.04<III<0.30.

TABLE 1

|  | III |
| --- | --- |
| Lens A1 | 0.043 |
| Lens A2 | 0.129 |
| Lens A3 | 0.239 |
| Lens A4 | 0.144 |
| Lens A5 | 0.083 |
| Lens A6 | 0.095 |
| Lens B | 0.033 |

Figure 19:
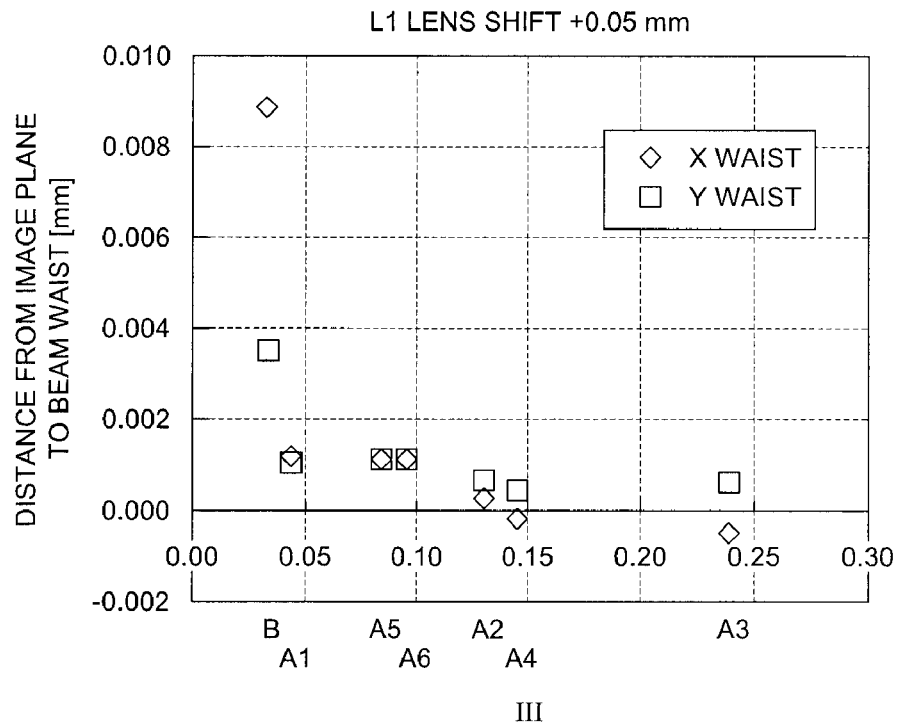
FIG. 19 is a chart formed by plotting changes in the distance from the image surface to beam waist with respect to the shift of the first lens L1 by +0.05 mm in the X-axis direction for each of the lenses A1 through A6 and lens B.

FIG. 19 is a chart created by plotting the changes in the distance from the image surface to the beam waist in the Examples 1 through 5 and Comparative Example when the first lens L1 has been shifted in the X-axis direction by +0.05 mm.

Figure 20:
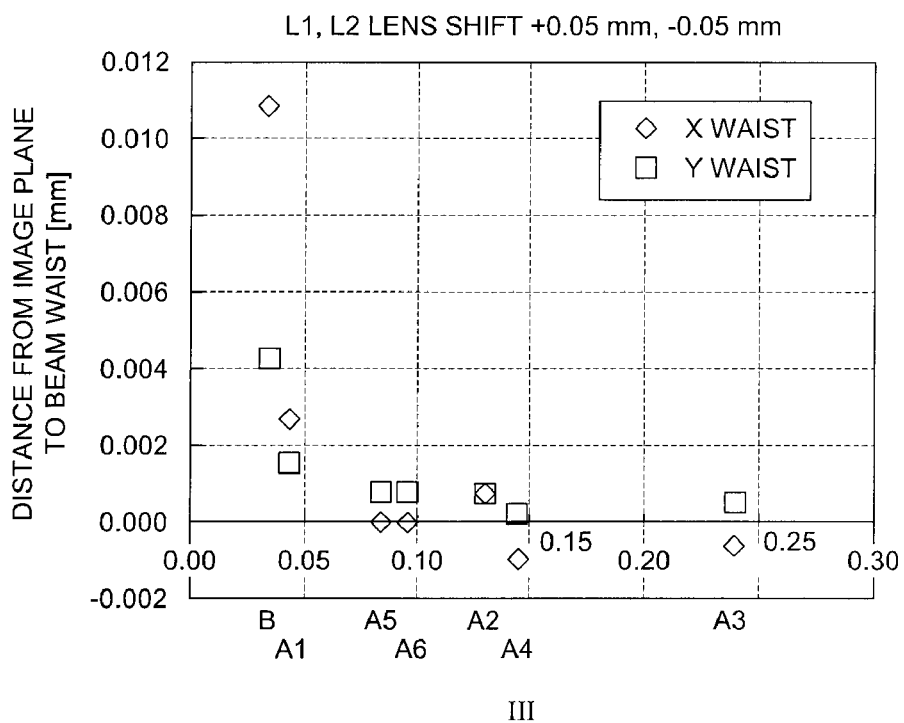
FIG. 20 is a chart formed by plotting charges in the distance from the image surface to beam waist with respect to the shift of the first lens L1 and second lens L2 by ±0.05 mm in the X-axis direction for each of the lenses A1 through A6 and lens B.

FIG. 20 is a chart created by plotting the changes in the distance from the image surface to the beam waist in the Examples 1 through 5 and Comparative Example when the first lens L1 and second lens L2 have been shifted in the X-axis direction by ±0.05 mm.

The horizontal axis in FIG. 19 and FIG. 20 indicates the third-order astigmatism coefficient III. The values of III corresponding to the Examples 1 through 5 and Comparative Example are assigned with the symbols of the lenses A1 through A6 and lens B.

FIG. 29 is a chart obtained by plotting $h_{sag}$ up to $h_{sag}=fb\times NA_{SHG}\times1.3+0.10$ (mm) for the Comparative Example and Examples 2 through 5, wherein the height of the optical surface from the optical axis facing the short conjugate distance side is plotted on the horizontal axis, and $\Delta_{sag}$ is plotted on the vertical axis. For the Examples 2 through 4, the $h_{sag}$ is kept within 6.5 μm<$\Delta_{sag}$<30 μm, wherein the height from the optical axis is $h_{sag}$. For the Comparative Example, the $h_{sag}$ is not kept within this range since $\Delta_{sag}$=5 μm.

FIG. 30 is a chart obtained by plotting $h_{sag}$ up to $h_{sag}=fb\times NA_{SHG}\times1.3+0.12$ mm for the Comparative Example and Examples 2 through 5, wherein the height of the optical surface from the optical axis on the short conjugate distance side is plotted on the horizontal axis, and $\Delta_{sag}$ is plotted on the vertical axis. For the Examples 2 through 5, the $h_{sag}$ is kept within 8 μm<$\Delta_{sag}$<40 μm, wherein the height from the optical axis is $h_{sag}$. For the Comparative Example, the $h_{sag}$ is not kept within this range since $\Delta_{sag}$=7 μm.

In Examples 2 through 5, $\Delta_{sag}$ satisfies 6.5 μm<$\Delta_{sag}$<30 μm when $h_{sag}=fb\times NA_{SHG}\times1.3+0.10$ mm, and $\Delta_{sag}$ satisfies 8 μm<$\Delta_{sag}$<40 μm when $h_{sag}=fb\times NA_{SHG}\times1.3+0.12$ mm. However, if any one of these conditions can be satisfied, it is possible to use a wider range of the tolerance in positioning the semiconductor laser, SHG element and lens. For example, in the optical element unit containing the lens whose optical surface is smaller than that in Examples 1 through 4, the $\Delta_{sag}$ is only required to satisfy 6.5 μm<$\Delta_{sag}$<30 μm wherein $h_{sag}=fb\times NA_{SHG}\times1.3+0.10$ mm.

Comparative Example 1

Lenses B were used for the first lens L1 and second lens L2, and changes in distance from the image surface to the beam waist were calculated when the first lens L1 was shifted in the X-axis and Y-axis directions. Table 2 shows the details of the arrangement for the object used for calculation.

Figure 1:
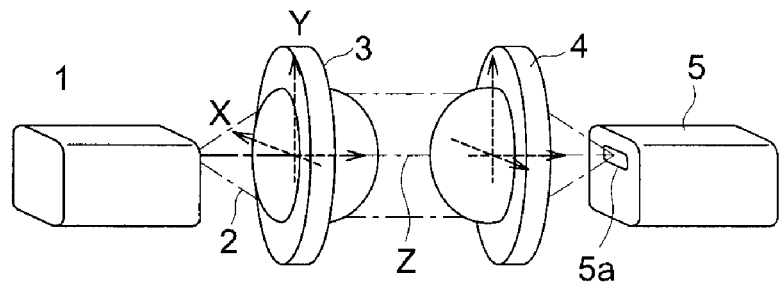
FIG. 1 is a basic schematic diagram representing the light source module according to the conventional art in the present invention.
Figure 2:
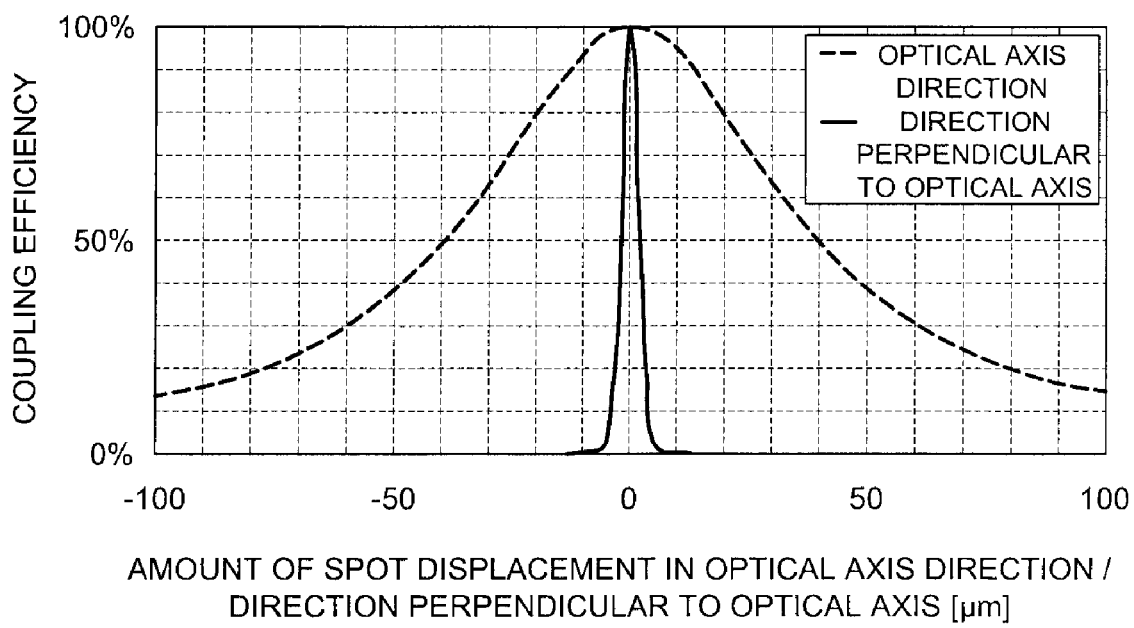
FIG. 2 is a chart showing a change in coupling efficiency with respect to spot displacement in the direction of optical axis and in the direction perpendicular to optical axis.
Figure 3:
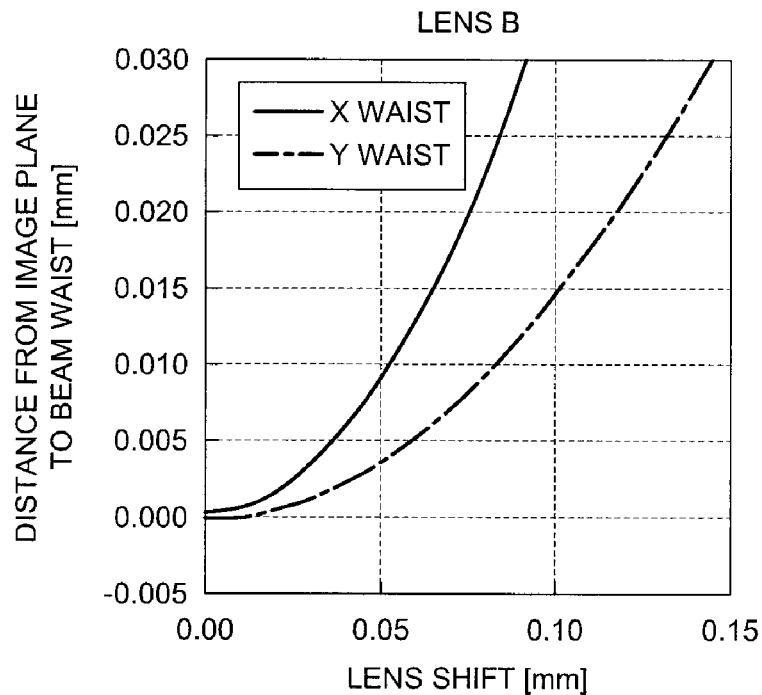
FIG. 3 is a chart representing the changes in distance from the image surface to the beam waist when the first lens L1 has been shifted in the X-axis direction, wherein the lenses B are used as the first lens L1 and second lens L2.
Figure 4:
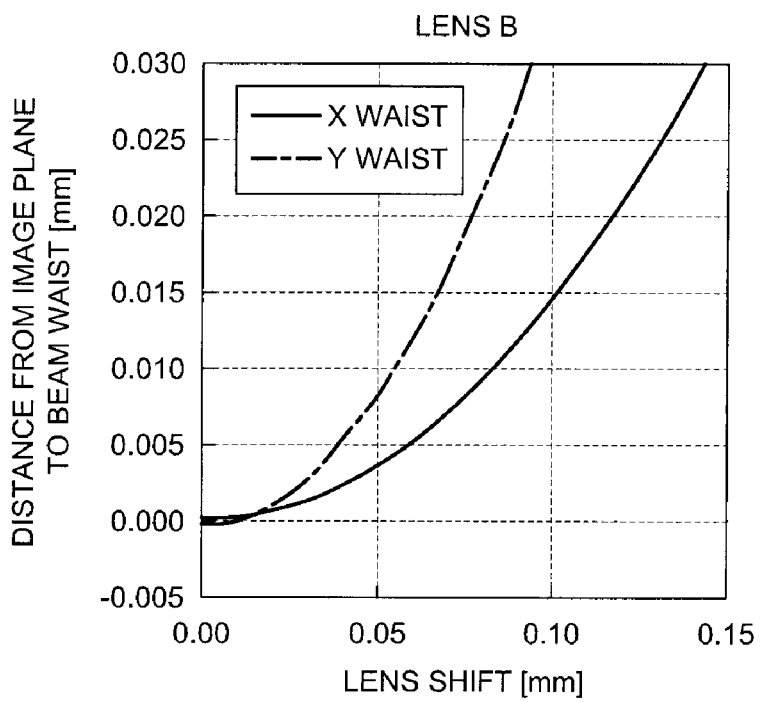
FIG. 4 is a chart representing the changes in distance from the image surface to the beam waist when the first lens L1 has been shifted in the Y-axis direction, wherein the lenses B are used as the first lens L1 and second lens L2.

FIG. 3 is a chart representing the changes in distance from the image surface to the beam waist when the first lens L1 has been shifted in the X-axis direction, wherein the lenses B are used as the first lens L1 and second lens L2. FIG. 4 is a chart representing the changes in distance from the image surface to the beam waist when the first lens L1 has been shifted in the Y-axis direction, wherein the lenses B are used as the first lens L1 and second lens L2.

As shown in FIG. 3 and FIG. 4, the distance of the beam waist from the image surface, together with the beam waist in the X-axis direction and beam waist in the Y-axis direction, exhibits a parabolic increase in conformity to an increase in the amount of shift of the lens B in the X-axis direction. Then a great spot displacement is caused in the Z-axis direction by the lens position adjustment in the X- and Y-axis directions by the actuator, with the result that a high coupling efficiency is hardly achieved.

Figure 11:
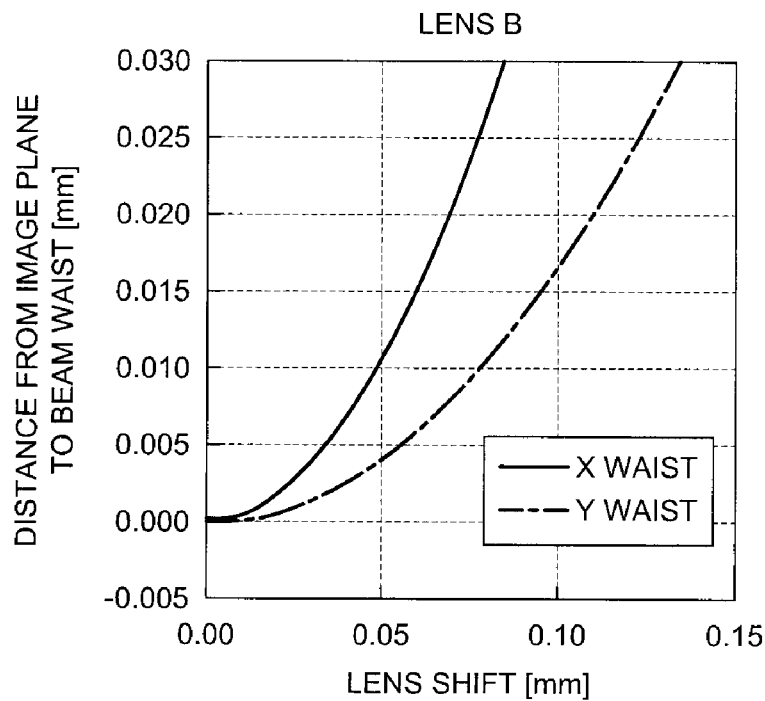
FIG. 11 is a chart showing a change in the distance from the image surface to the beam waist with respect to the relative shift of both lenses in the X-axis direction when the lenses B are used as the first lens L1 and second lens L2.
Figure 12:
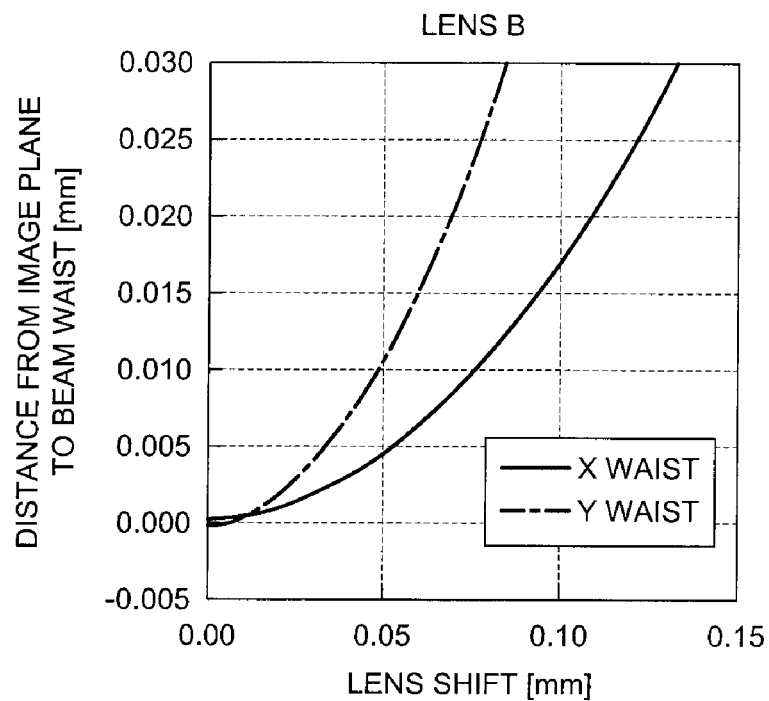
FIG. 12 is a chart showing a change in the distance from the image surface to the beam waist with respect to the relative shift of the first lens L1 and second lens L2 in the Y-axis direction when the lenses B are used as these first lens L1 and second lens L2.

FIG. 11 is a chart showing a change in the distance from the image surface to the beam waist with respect to the relative shift of the first lens L1 and second lens L2 in the X-axis direction when the lenses B are used as these first lens L1 and second lens L2. FIG. 12 is a chart showing a change in the distance from the image surface to the beam waist with respect to the shift of the first lens L1 and second lens L2 in the Y-direction when the lenses B are used as these first lens L1 and second lens L2.

As shown in FIG. 11 and FIG. 12, the distance of the beam waist from the image surface, together with the beam waist in the X-axis direction and beam waist in the Y-axis direction, exhibits a parabolic increase in conformity to an increase in the amount of shift of the lens B in the X-axis direction. Then a great spot misalignment is caused in the Z-axis direction by the lens position adjustment in the X- and Y-axis directions by the actuator, with the result that a high coupling efficiency is hardly achieved.

TABLE 2

Lens B

Paraxial data

| Surface number | Curvature radius | Thickness | Lens material | Remarks |
|---|---|---|---|---|
| 1 | ∞ | 0.638 | | Light source |
| 2 | 2.18523 | 1.400 | BAL35 | Collimation lens |
| 3 | −0.95551 | 0.000 | | (First lens) |
| 4 | ∞ | 1.000 | | |
| 5 | 0.95551 | 1.400 | BAL35 | Coupling lens |
| 6 | −2.18523 | 0.000 | | (Second lens) |
| 7 | ∞ | 0.638 | | |
| 8 | ∞ | 0.000 | | Waveguide |

Aspherical coefficient

| Surface number | 2nd plane | 3rd plane | 5th plane | 6th plane |
|---|---|---|---|---|
| k | −3.04953E+01 | −1.05204E+00 | −1.05204E+00 | −3.04953E+01 |
| A4 | −4.10190E−02 | −6.91635E−02 | 6.91635E−02 | 4.10190E−02 |
| A6 | 1.98607E−02 | −6.72005E−03 | 6.72005E−03 | −1.98607E−02 |
| A8 | 0.00000E+00 | 0.00000E+00 | 0.00000E+00 | 0.00000E+00 |
| A10 | 0.00000E+00 | 0.00000E+00 | 0.00000E+00 | 0.00000E+00 |
| A12 | 0.00000E+00 | 0.00000E+00 | 0.00000E+00 | 0.00000E+00 |

TABLE 2-continued

Lens B

Focal distance [mm]

| Collimating lens | 1.38 |
|---|---|
| Coupling lens | 1.38 |

Light source wavelength [μm]

1.06

Tolerance [μm]

| | | X | Y |
|---|---|---|---|
| L2 shift | L1 correction | 66 | 75 |
| SHG shift | L1 correction | 87 | 81 |

Mode field radius [μm]

| | X | Y |
|---|---|---|
| Light source | 2.5 | 1.0 |
| Waveguide | 2.0 | 1.5 |

$\Delta_{sag}$ [mm]

| up to 0.10 mm | 0.0052 |
|---|---|
| up to 0.12 mm | 0.0062 |

Value III 0.033

Example 1

Lenses A1 were used for the first lens L1 and second lens L2, and changes in distance from the image surface to the beam waist were calculated when the first lens L1 was shifted in the X-axis and Y-axis directions, Table 3 shows the details of the arrangement for the object used for calculation.

As shown in FIG. 19 and FIG. 20, a considerable suppression of the displacement of beam waist can be observed in the lens A1 kept within 0.04<III<0.30, as compared to the lens B lying outside this range. Thus, use of the lens A1 reduces spot misalignment in the Z-axis direction resulting from lens position adjustment in the X- and Y-axis directions, and a high coupling efficiency can be achieved by lens position adjustment in the X- and Y-axis directions.

TABLE 3

Lens A1

Paraxial data

| Surface number | Curvature radius | Thickness | Lens material | Remarks |
|---|---|---|---|---|
| 1 | ∞ | 0.279 | | Light source |
| 2 | −7.78927 | 1.500 | BAL35 | Collimation lens |
| 3 | −0.70723 | 0.000 | | (First lens) |
| 4 | ∞ | 0.800 | | |
| 5 | 0.70723 | 1.500 | BAL35 | Coupling lens |
| 6 | 7.78927 | 0.000 | | (Second lens) |
| 7 | ∞ | 0.279 | | |
| 8 | ∞ | 0.000 | | Waveguide |

TABLE 3-continued

Lens A1

Aspherical coefficient

| Surface number | 2nd plane | 3rd plane | 5th plane | 6th plane |
|---|---|---|---|---|
| k   | 1.28401E+01  | −4.03956E−01 | −4.03956E−01 | 1.28401E+01 |
| A4  | −4.09333E+00 | 2.04899E−03  | −2.04899E−03 | 4.09333E+00 |
| A6  | −4.19151E+01 | 9.47757E−04  | −9.47757E−04 | 4.19151E+01 |
| A8  | 0.00000E+00  | −6.16526E−02 | 6.16526E−02  | 0.00000E+00 |
| A10 | 0.00000E+00  | −5.45836E−03 | 5.45836E−03  | 0.00000E+00 |
| A12 | 0.00000E+00  | 0.00000E+00  | 0.00000E+00  | 0.00000E+00 |

Focal distance [mm]

| Collimating lens | 1.25 |
|---|---|
| Coupling lens | 1.25 |

Wavelength [μm]

| 1.06 |
|---|

Tolerance [μm]

|  |  | X | Y |
|---|---|---|---|
| L2 shift | L1 correction | 140 | 140 |
| SHG shift | L1 correction | 102 | 106 |

Mode field radius [μm]

|  | X | Y |
|---|---|---|
| Light source | 2.5 | 1.0 |
| Waveguide | 2.0 | 1.5 |

Value III

| 0.043 |
|---|

Example 2

Lenses A2 were used for the first lens L1 and second lens L2, and changes in distance from the image surface to the beam waist were calculated when the first lens L1 was shifted in the X-axis and Y-axis directions. Table 4 shows the details of the arrangement for the object used for calculation.

As shown in FIG. 19 and FIG. 20, a considerable suppression of the displacement of beam waist can be observed in the lens A2 kept within $0.04 < \text{III} < 0.30$, as compared to the lens B lying outside this range. Thus, use of the lens A2 reduces spot misalignment in the Z-axis direction resulting from lens position adjustment in the X- and Y-axis directions, and a high coupling efficiency can be achieved by lens position adjustment in the X- and Y-axis directions.

Figure 6:
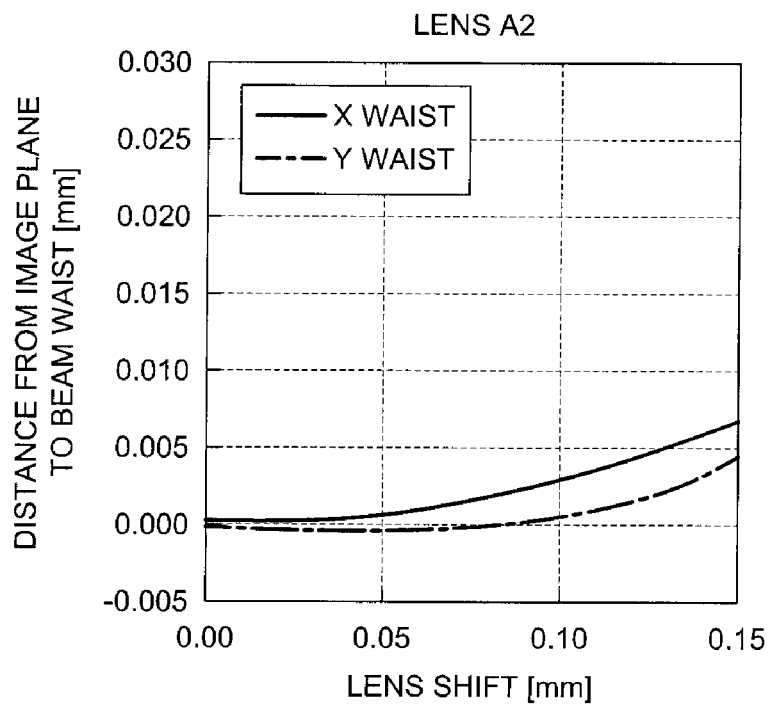
FIG. 6 is a chart showing a change in the distance from the image surface to the beam waist with respect to the shift of the first lens L1 in the Y-axis direction when the lenses A2 are used as the first lens L1 and second lens L2.

FIG. 5 is a chart showing a change in the distance from the image surface to the beam waist with respect to the shift of the first lens L1 in the X-axis direction when the lenses A2 are used as the first lens L1 and second lens L2. FIG. 6 is a chart showing a change in the distance from the image surface to the beam waist with respect to the shift of the first lens L1 in the Y-axis direction when the lenses A2 are used as the first lens L1 and second lens L2.

In the Comparative Example, when the lens L1 is shifted in the X-direction, the position of the beam waist in the X-direction is 0.009 mm if the amount of shift is 0.05 mm. When the lens L1 is shifted in the Y-direction, the position of the beam waist in the Y-direction is 0.009 mm if the amount of shift is 0.05 mm. This signifies an excessive increase in the amount of defocusing. In Example 2, by contrast, when the lens L1 is shifted in the X-direction, the maximum beam waist in the X-direction does not exceed 0.003 mm even if the amount of shift is 0.05 mm. When the lens L1 is shifted in the Y-direction, the maximum beam waist in the Y-direction does not exceed 0.003 mm even if the amount of shift is 0.05 mm. This makes it possible to secure a greater tolerance of the misalignment in the direction of optical axis.

As shown in FIG. 5 and FIG. 6, especially when the lens shift lies in the range from 0.00 through 0.10 mm, use of the lens A2 provides a considerable reduction in the displacement of the beam waist. Thus, use of the lens A2 reduces spot misalignment in the Z-axis direction resulting from lens position adjustment in the X- and Y-axis directions, and a high coupling efficiency can be achieved by lens position adjustment in the X- and Y-axis directions.

Figure 13:
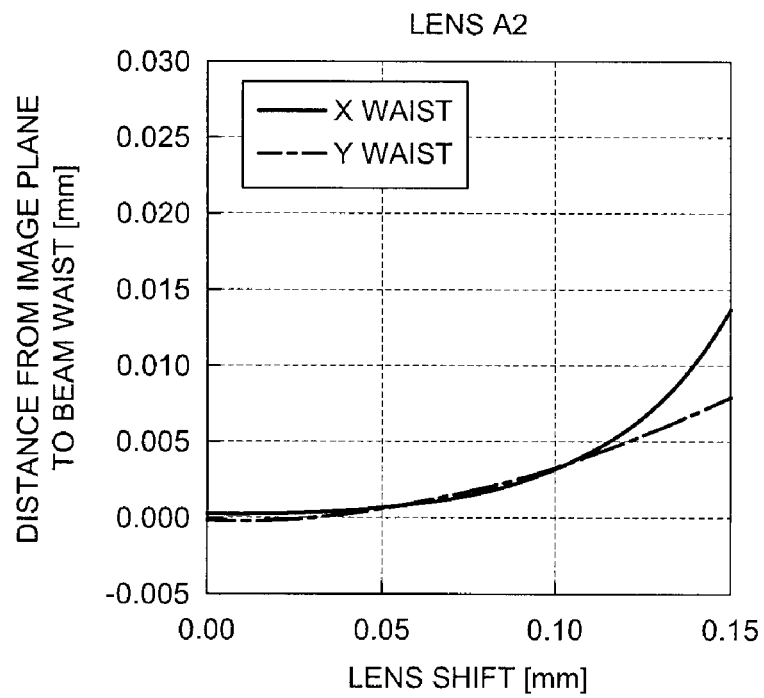
FIG. 13 is a chart showing a change in the distance from the image surface to the beam waist with respect to the relative shift of the first lens L1 and second lens L2 in the X-axis direction when the lenses A2 are used as these first lens L1 and second lens L2.
Figure 14:
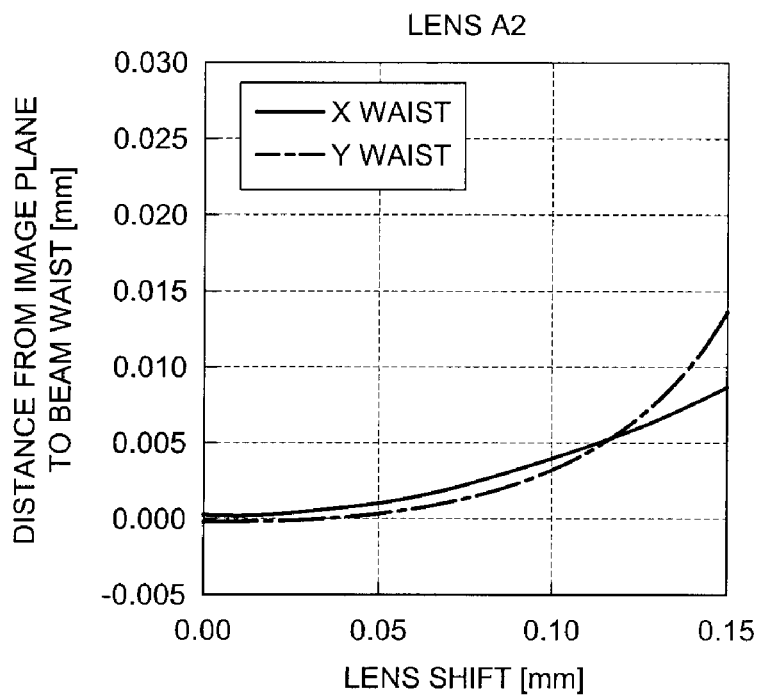
FIG. 14 is a chart showing a change in the distance from the image surface to the beam waist with respect to the relative shift of the first lens L1 and second lens L2 in the Y-axis direction when the lenses A2 are used as these first lens L1 and second lens L2.

FIG. 13 is a chart showing a change in the distance from the image surface to the beam waist with respect to the relative shift of the first lens L1 and second lens L2 in the X-axis direction when the lenses A2 are used as these first lens L1 and second lens L2. FIG. 14 is a chart showing a change in the distance from the image surface to the beam waist with respect to the relative shift of the first lens L1 and second lens L2 in the Y-axis direction when the lenses A2 are used as these first lens L1 and second lens L2.

In the Comparative Example, when the lenses L1 and L2 are shifted reversely in the X-direction, the beam waist position in the X-direction is 0.011 mm if the amount of shift is 0.05 mm. When the lenses L1 is shifted in the Y-direction, the beam waist position in the Y-direction is 0.011 mm if the amount of shift is 0.05 mm. This signifies an excessive increase in the amount of defocusing. In Examples 1 through 5, by contrast, when the lenses L1 and L2 are shifted reversely in the X-direction, the maximum beam waist in the X-direction does not exceed 0.004 mm even if the amount of shift is 0.05 mm. When the lenses L1 and L2 are shifted reversely in the Y-direction, the maximum beam waist in the Y-direction does not exceed 0.004 mm when the amount of shift is 0.05 mm. This makes it possible to secure a greater tolerance of the misalingment in the direction of optical axis.

As shown in FIG. 13 and FIG. 14, use of the lens A2 provides a considerable reduction in the beam waist displacement especially when the lens shift is kept in the range of 0.00 through 0.10 mm. Thus, use of the lens A2 reduces spot misalignment in the Z-axis direction resulting from lens position adjustment in the X- and Y-axis directions, and a high coupling efficiency can be achieved by lens position adjustment in the X- and Y-axis directions.

TABLE 4

Lens A2

Paraxial data

| Surface number | Curvature radius | Thickness | Lens material | Remarks |
|---|---|---|---|---|
| 1 | ∞ | 0.451 | | Light source |
| 2 | −8.86731 | 1.500 | BAL35 | Collimation lens |
| 3 | −0.80235 | 0.000 | | (First lens) |
| 4 | ∞ | 1.000 | | |
| 5 | 0.80235 | 1.500 | BAL35 | Coupling lens |
| 6 | 8.86731 | 0.000 | | (Second lens) |
| 7 | ∞ | 0.451 | | |
| 8 | ∞ | 0.000 | | Waveguide |

TABLE 4-continued

Lens A2

Aspherical coefficient

| Surface number | 2nd plane | 3rd plane | 5th plane | 6th plane |
|---|---|---|---|---|
| k | −6.60791E−01 | −8.02347E−01 | 8.02347E−01 | 8.86731E+00 |
| A4 | −6.99284E+01 | −3.58263E−01 | −3.58263E−01 | −6.99284E+01 |
| A6 | −1.63862E+00 | 6.62020E−03 | −6.62020E−03 | 1.63862E+00 |
| A8 | −3.87313E+00 | −3.58273E−03 | 3.58273E−03 | 3.87313E+00 |
| A10 | −2.00000E+01 | −1.52817E−02 | 1.52817E−02 | 2.00000E+01 |
| A12 | 0.00000E+00 | −2.40799E−02 | 2.40799E−02 | 0.00000E+00 |

Focal distance [mm]

| Collimating lens | 1.43 |
|---|---|
| Coupling lens | 1.43 |

Light source wavelength [µm]

1.06

Tolerance [µm]

| | | X | Y |
|---|---|---|---|
| L2 shift | L1 correction | 129 | 153 |
| SHG shift | L1 correction | 114 | 162 |

Mode field radius [µm]

| | X | Y |
|---|---|---|
| Light source | 2.5 | 1.0 |
| Waveguide | 2.0 | 1.5 |

$\Delta_{sag}$ [mm]

| up to 0.10 mm | 0.013 |
|---|---|
| up to 0.12 mm | 0.018 |

Value III 0.129

Example 3

Lenses A3 were used for the first lens L1 and second lens L2, and changes in distance from the image surface to the beam waist were calculated when the first lens L1 was shifted in the X-axis and Y-axis directions. Table 4 shows the details of the arrangement for the object used for calculation.

As shown in FIG. 19 and FIG. 20, a considerable suppression of the displacement of beam waist can be observed in the lens A3 kept within 0.04<III<0.30, as compared to the lens B lying outside this range. Thus, use of the lens A3 reduces spot misalignment in the Z-axis direction resulting from lens position adjustment in the X- and Y-axis directions, and a high coupling efficiency can be achieved by lens position adjustment in the X- and Y-axis directions.

Figure 7:
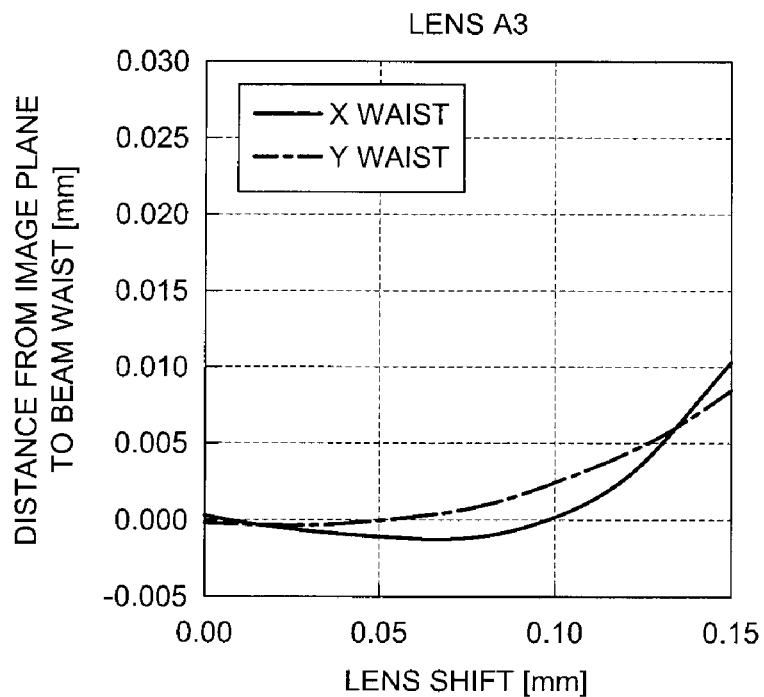
FIG. 7 is a chart showing a change in the distance from the image surface to the beam waist with respect to the shift of the first lens L1 in the X-axis direction when the lenses A3 are used as the first lens L1 and second lens L2.
Figure 8:
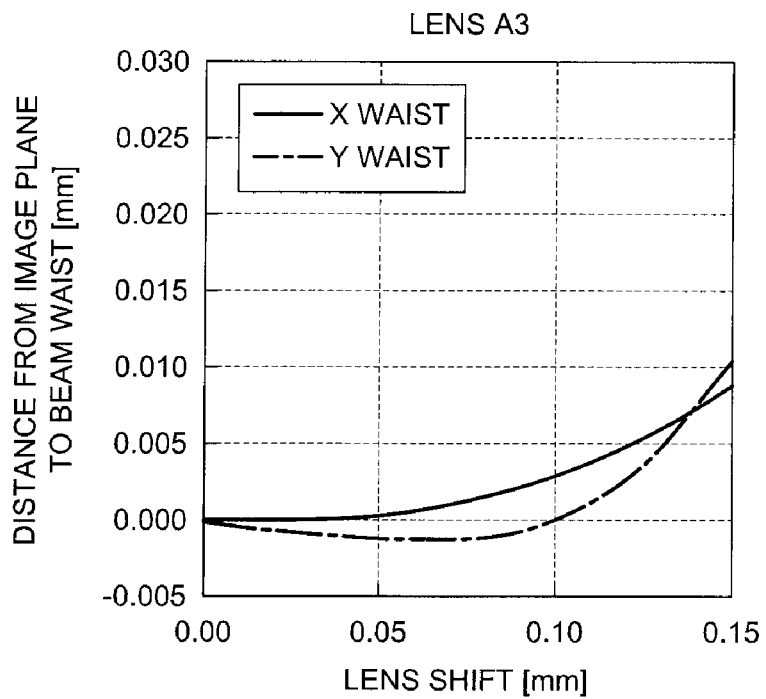
FIG. 8 is a chart showing a change in the distance from the image surface to the beam waist with respect to the shift of the first lens L1 in the Y-axis direction when the lenses A3 are used as the first lens L1 and second lens L2.

FIG. 7 is a chart showing a change in the distance from the image surface to the beam waist with respect to the shift of the first lens L1 in the X-axis direction when the lenses A3 are used as the first lens L1 and second lens L2. FIG. 8 is a chart showing a change in the distance from the image surface to the beam waist with respect to the shift of the first lens L1 in the Y-axis direction when the lenses A3 are used as the first lens L1 and second lens L2.

As shown in FIG. 7 and FIG. 8, especially when the lens shift lies in the range from 0.00 through 0.10 mm, use of the lens A3 provides a considerable reduction in the displacement of the beam waist. Thus, use of the lens A3 reduces spot misalignment in the Z-axis direction resulting from lens position adjustment in the X- and Y-axis directions, and a high coupling efficiency can be achieved by lens position adjustment in the X- and Y-axis directions.

In a change with respect to the lens shift of the X-waist in FIG. 7, the change curve is so formed that the minimum level is reached when the lens shift lies in the range of 0.05 through 0.10 mm. This is one of the most remarkable characteristics as compared to FIG. 3.

In the change with respect to the lens shift of the Y-waist in FIG. 8 as well, the change curve is so formed that the minimum level is reached when the lens shift lies in the range of 0.05 through 0.10 mm. This is one of the most remarkable characteristics as compared to FIG. 4.

Figure 15:
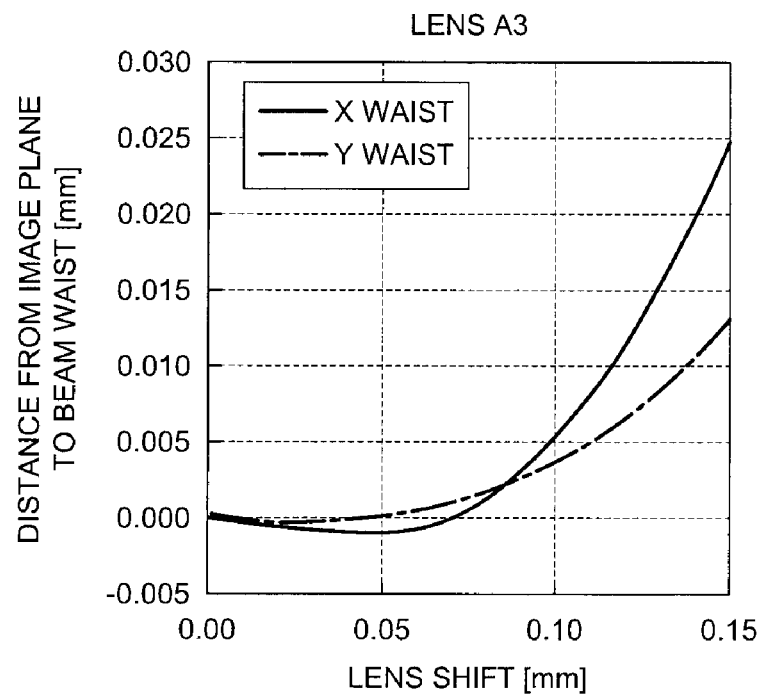
FIG. 15 is a chart showing a change in the distance from the image surface to the beam waist with respect to the relative shift of the first lens L1 and second lens L2 in the X-axis direction when the lenses A3 are used as these first lens L1 and second lens L2.
Figure 16:
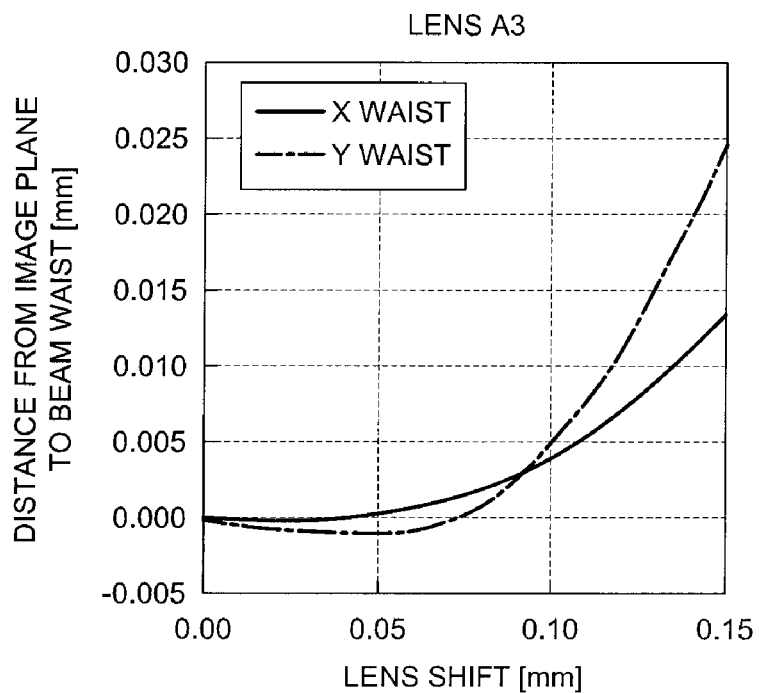
FIG. 16 is a chart showing a change in the distance from the image surface to the beam waist with respect to the relative shift of the first lens L1 and second lens L2 in the Y-axis direction when the lenses A3 are used as these first lens L1 and second lens L2.

FIG. 15 is a chart showing a change in the distance from the image surface to the beam waist with respect to the relative shift of the first lens L1 and second lens L2 in the X-axis direction when the lenses A3 are used as these first lens L1 and second lens L2. FIG. 16 is a chart showing a change in the distance from the image surface to the beam waist with respect to the relative shift of the first lens L1 and second lens L2 in the Y-axis direction when the lenses A3 are used as these first lens L1 and second lens L2.

As shown in FIG. 15 and FIG. 16, use of the lens A3 also provides a considerable reduction in the beam waist displacement especially when the lens shift is kept in the range of 0.00 through 0.10 mm. Thus, use of the lens A3 reduces spot misalignment in the Z-axis direction resulting from lens position adjustment in the X- and Y-axis directions, and a high coupling efficiency can be achieved by lens position adjustment in the X- and Y-axis directions.

In a change with respect to the lens shift of the X-waist in FIG. 15, the change curve is so formed that the minimum level is reached when the lens shift lies in the vicinity of 0.05 mm. This is one of the most remarkable characteristics as compared to FIG. 15. In the change with respect to the lens shift of the Y-waist in FIG. 16 as well, the change curve is so formed that the minimum level is reached when the lens shift lies in the range of 0.05 through 0.10 mm. This is one of the most remarkable characteristics as compared to FIG. 10.

TABLE 5

Lens A3

Paraxial data

| Surface number | Curvature radius | Thickness | Lens material | Remarks |
|---|---|---|---|---|
| 1 | ∞ | 0.685 | | Light source |
| 2 | 2.45814 | 1.400 | BAL35 | Collimation lens |
| 3 | −0.98434 | 0.000 | | (First lens) |
| 4 | ∞ | 0.500 | | |
| 5 | 0.98434 | 1.400 | BAL35 | Coupling lens |
| 6 | −2.45814 | 0.000 | | (Second lens) |
| 7 | ∞ | 0.685 | | |
| 8 | ∞ | 0.000 | | Waveguide |

Aspherical coefficient

| Surface number | 2nd plane | 3rd plane | 5th plane | 6th plane |
|---|---|---|---|---|
| k | −6.60791E−01 | −8.02347E−01 | 8.02347E−01 | 8.86731E+00 |
| A4 | −6.99284E+01 | −3.58263E−01 | −3.58263E−01 | −6.99284E+01 |

TABLE 5-continued

Lens A3

| | | | | |
|---|---|---|---|---|
| A6 | −1.63862E+00 | 6.62020E−03 | −6.62020E−03 | 1.63862E+00 |
| A8 | −3.87313E+00 | −3.58273E−03 | 3.58273E−03 | 3.87313E+00 |
| A10 | −2.00000E+01 | −1.52817E−02 | 1.52817E−02 | 2.00000E+01 |
| A12 | 0.00000E+00 | −2.40799E−02 | 2.40799E−02 | 0.00000E+00 |

Focal distance [mm]

| | |
|---|---|
| Collimating lens | 1.43 |
| Coupling lens | 1.43 |

Light source wavelength [μm]

1.06

Tolerance [μm]

| | | X | Y |
|---|---|---|---|
| L2 shift | L1 correction | 78 | 120 |
| SHG shift | L1 correction | 105 | 123 |

Mode field radius [μm]

| | X | Y |
|---|---|---|
| Light source | 2.5 | 1.0 |
| Waveguide | 2.0 | 1.5 |

$\Delta_{sag}$ [mm]

| | |
|---|---|
| up to 0.10 mm | 0.008 |
| up to 0.12 mm | 0.009 |

Value III 0.239

Example 4

Lenses A4 were used for the first lens L1 and second lens L2, and changes in distance from the image surface to the beam waist were calculated when the first lens L1 was shifted in the X-axis and Y-axis directions. Table 6 shows the details of the arrangement for the object used for calculation.

As shown in FIG. 19 and FIG. 20, a considerable suppression of the displacement of beam waist can be observed in the lens A4 kept within 0.04<III<0.30, as compared to the lens B lying outside this range. Thus, use of the lens A4 reduces spot misalignment in the Z-axis direction resulting from lens position adjustment in the X- and Y-axis directions, and a high coupling efficiency can be achieved by lens position adjustment in the X- and Y-axis directions.

TABLE 6

Lens A4

Paraxial data

| Surface number | Curvature radius | Thickness | Lens material | Remarks |
|---|---|---|---|---|
| 1 | ∞ | 0.703 | | Light source |
| 2 | −11.19773 | 1.500 | BAM4 | Collimation lens (First lens) |
| 3 | −0.95819 | 0.000 | | |
| 4 | ∞ | 1.000 | | |
| 5 | 0.95819 | 1.500 | BAM4 | Coupling lens |

TABLE 6-continued

Lens A4

| | | | |
|---|---|---|---|
| 6 | 11.19773 | 0.000 | (Second lens) |
| 7 | ∞ | 0.703 | |
| 8 | ∞ | 0.000 | Waveguide |

Aspherical coefficient

| Surface number | 2nd plane | 3rd plane | 5th plane | 6th plane |
|---|---|---|---|---|
| k | −5.00000E+02 | −4.82754E−01 | −4.82754E−01 | −5.00000E+02 |
| A4 | −6.92479E−01 | −2.25496E−02 | 2.25496E−02 | 6.92479E−01 |
| A6 | 0.00000E+00 | −2.36086E−02 | 2.36086E−02 | 0.00000E+00 |
| A8 | 0.00000E+00 | 0.00000E+00 | 0.00000E+00 | 0.00000E+00 |
| A10 | 0.00000E+00 | 0.00000E+00 | 0.00000E+00 | 0.00000E+00 |
| A12 | 0.00000E+00 | 0.00000E+00 | 0.00000E+00 | 0.00000E+00 |

Focal distance [mm]

| | |
|---|---|
| Collimating lens | 1.68 |
| Coupling lens | 1.68 |

Light source wavelength [μm]

1.00

Tolerance [μm]

| | | X | Y |
|---|---|---|---|
| L2 shift | L1 correction | 148 | 148 |
| SHG shift | L1 correction | 126 | 126 |

Mode field radius [μm]

| | X | Y |
|---|---|---|
| Light source | 2.5 | 2.5 |
| Waveguide | 2.5 | 2.5 |

$\Delta_{sag}$ [mm]

| | |
|---|---|
| up to 0.10 mm | 0.015 |
| up to 0.12 mm | 0.018 |

Value III 0.144

Example 5

Lens A6 was used for the first lens L1, and lens A5 was used for the second lens L2. Then changes in distance from the image surface to the beam waist were calculated when the first lens L1 was shifted in the X-axis and Y-axis directions. Table 7 shows the details of the arrangement for the object used for calculation.

As shown in FIG. 19 and FIG. 20, a considerable suppression of the displacement of beam waist can be observed in the lens A5 and A6 kept within 0.04<III<0.30, as compared to the lens B lying outside this range. Thus, use of the lenses A5 and A6 reduces spot misalignment in the Z-axis direction resulting from lens position adjustment in the X- and Y-axis directions, and a high coupling efficiency can be achieved by lens position adjustment in the X- and Y-axis directions.

Figure 9:
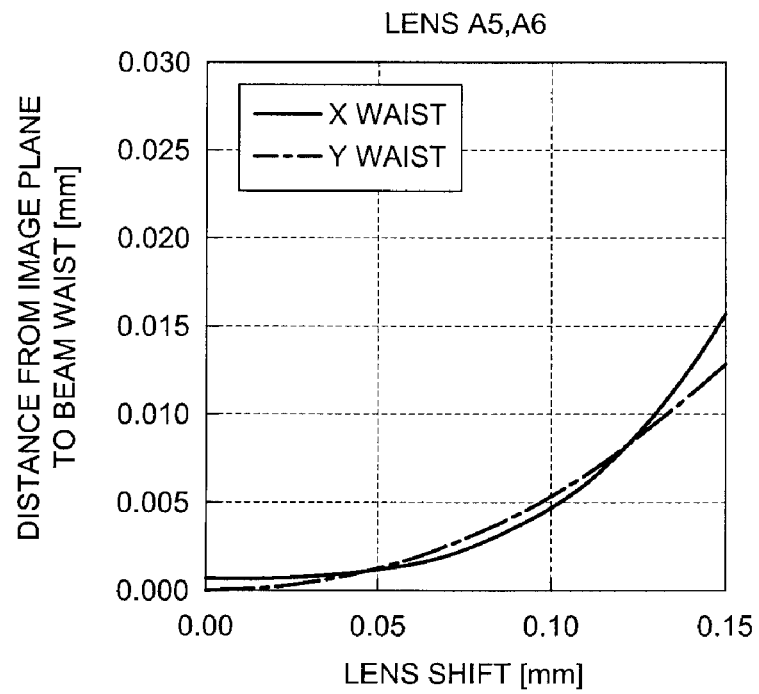
FIG. 9 is a chart showing a change in the distance from the image surface to the beam waist when the first lens L1 is shifted in the X-axis direction, wherein the lens A6 is used as the first lens L1 and the lens A5 is used as the second lens L2.
Figure 10:
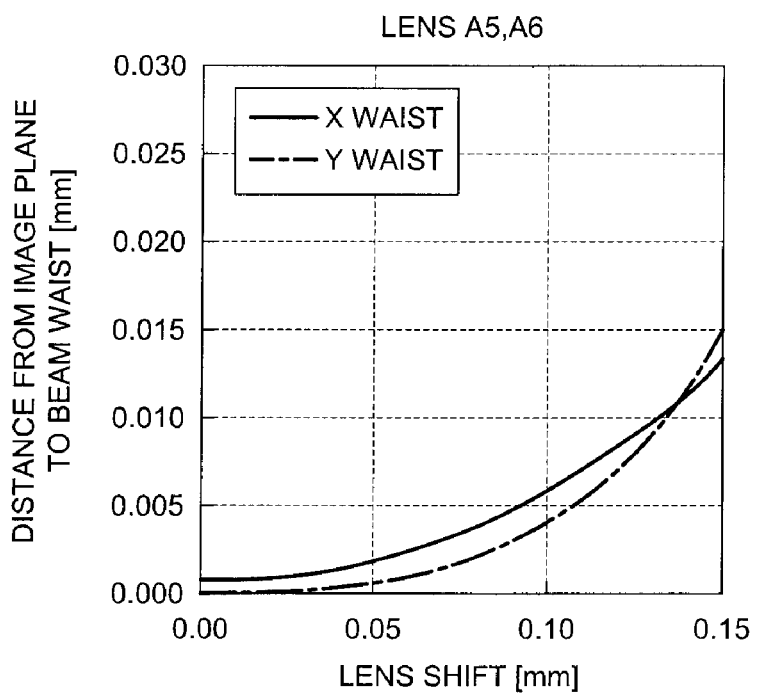
FIG. 10 is a chart showing a change in the distance from the image surface to the beam waist when the first lens L1 is shifted in the Y-axis direction, wherein the lens A6 is used as the first lens L1 and the lens A5 is used as the second lens L2.

FIG. 9 is a chart showing a change in the distance from the image surface to the beam waist when the first lens L1 is shifted in the X-axis direction, wherein the lens A6 is used as the first lens L1 and the lens A5 is used as the second lens L2. FIG. 10 is a chart showing a change in the distance from the image surface to the beam waist when the first lens L1 is shifted in the Y-axis direction, wherein the lens A6 is used as the first lens L1 and the lens A5 is used as the second lens L2.

As shown in FIG. 9 and FIG. 10, use of the lens A2 also provides a considerable reduction in the beam waist displacement especially when the lens shift is kept in the range of 0.00 through 0.10 mm. Thus, use of the lenses A5 and A6 reduces spot misalignment in the Z-axis direction resulting from lens position adjustment in the X- and Y-axis directions, and a high coupling efficiency can be achieved by lens position adjustment in the X- and Y-axis directions.

Figure 17:
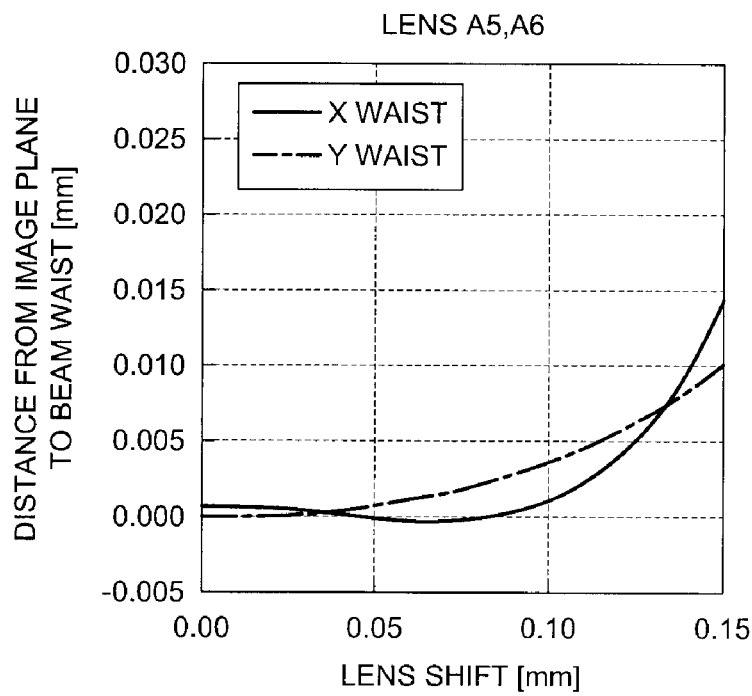
FIG. 17 is a chart showing a change in the distance from the image surface to the beam waist with respect to the relative shift of both lenses in the X-axis direction when the lens A6 is used as the first lens L1 and the lens AS is used as the second lens L2.
Figure 18:
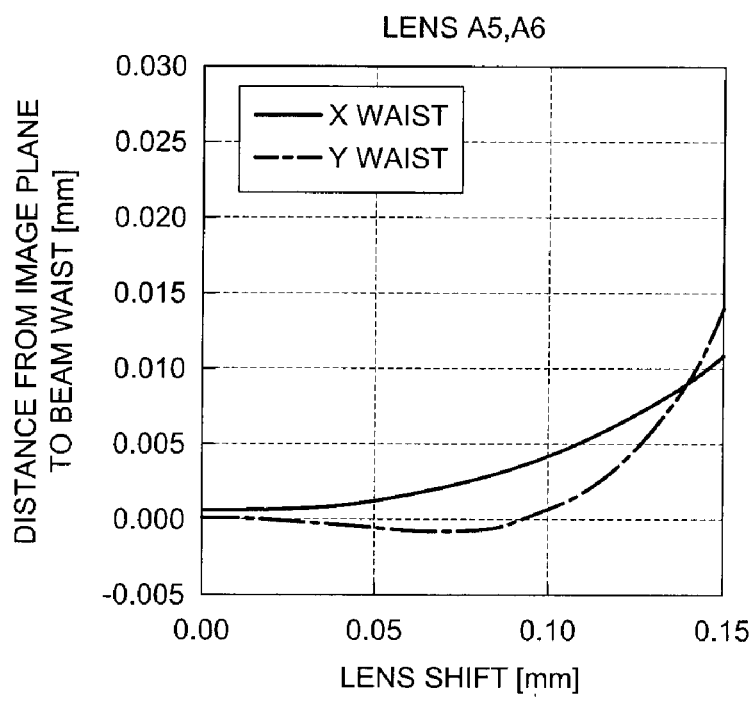
FIG. 18 is a chart showing a change in the distance from the image surface to the beam waist with respect to the relative shift of both lenses in the Y-axis direction when the lens A6 is used as the first lens L1 and the lens AS is used as the second lens L2.

FIG. 17 is a chart showing a change in the distance from the image surface to the beam waist with respect to the relative shift of the first lens L1 and second lens L2 in the X-axis direction when the lens A6 is used as the first lens L1 and the lens A5 is used as the second lens L2. FIG. 18 is a chart showing a change in the distance from the image surface to the beam waist with respect to the relative shift of the first lens L1 and second lens L2 in the Y-axis direction when the lens A6 is used as the first lens L1 and the lens A5 is used as the second lens L2.

As shown in FIG. 17 and FIG. 18, use of the lenses A5 and A6 provides a considerable reduction in the beam waist displacement especially when the lens shift is kept in the range of 0.00 through 0.10 mm.

Thus, use of the lenses A5 and A6 reduces spot misalignment in the Z-axis direction resulting from lens position adjustment in the X- and Y-axis directions, and a high coupling efficiency can be achieved by lens position adjustment in the X- and Y-axis directions.

In the change with respect to the lens shift of the X-waist in FIG. 17, the change curve is so formed that the minimum level is reached when the lens shift lies in the range of 0.05 through 0.10 mm. This is one of the most remarkable characteristics as compared to FIG. 11.

Further, in the change with respect to the lens shift of the Y-waist in FIG. 18 as well, the change curve is so formed that the minimum level is reached when the lens shift lies in the range of 0.05 through 0.10 mm. This is one of the most remarkable characteristics as compared to FIG. 12.

TABLE 7

Lenses A5 and A6

Paraxial data

| Surface number | Curvature radius | Thickness | Lens material | Remarks |
|---|---|---|---|---|
| 1 | ∞ | 0.441 | | Light source |
| 2 | −6.22093 | 1.300 | BAL35 | Collimation lens |
| 3 | −0.72112 | 0.000 | | (First lens) |
| 4 | ∞ | 0.800 | | |
| 5 | 0.87992 | 1.300 | BAL35 | Coupling lens |
| 6 | 17.41386 | 0.000 | | (Second lens) |
| 7 | ∞ | 0.718 | | |
| 8 | ∞ | 0.000 | | Waveguide |

Aspherical coefficient

| Surface number | 2nd plane | 3rd pane | 5th plane | 6th plane |
|---|---|---|---|---|
| k | 4.15858E+02 | −2.93442E−01 | −2.85601E−01 | 5.00000E+02 |
| A4 | −1.54644E+00 | 3.48217E−02 | 7.03091E−03 | 8.14354E−01 |
| A6 | −1.96302E+00 | 1.41202E−02 | 5.20637E−03 | 2.41403E−01 |
| A8 | −6.03724E+01 | 1.99094E−02 | 4.65267E−02 | 0.00000E+00 |

TABLE 7-continued

Lenses A5 and A6

| | | | |
|---|---|---|---|
| A10 | 0.00000E+00 | −8.20010E−02 | −8.00157E−02 | 0.00000E+00 |
| A12 | 0.00000E+00 | 0.00000E+00 | 0.00000E+00 | 0.00000E+00 |

Focal distance [mm]

| | |
|---|---|
| Collimating lens | 1.30 |
| Coupling lens | 1.56 |

Light source wavelength [μm]

1.06

Tolerance [μm]

| | | X | Y |
|---|---|---|---|
| L2 shift | L1 correction | 140 | 140 |
| SHG shift | L1 correction | 137 | 137 |

Mode field radius [μm]

| | X | Y |
|---|---|---|
| Light source | 1.5 | 1.5 |
| Waveguide | 1.8 | 1.8 |

$\Delta_{sag}$ [mm]

| | L1 | L2 |
|---|---|---|
| up to 0.10 mm | 0.015 | 0.020 |
| up to 0.12 mm | 0.023 | 0.025 |

Value III

| | |
|---|---|
| L1 | 0.095 |
| L2 | 0.083 |

As shown in FIG. 19 and FIG. 20, in the Comparative Example, when the lens L1 is shifted in the X-direction, the beam waist position in the X-direction is 0.009 mm if the amount of shift is 0.05 mm. When the lenses L1 is shifted in the X-direction, the beam waist position in the Y-direction is 0.009 mm if the amount of shift is 0.05 mm. This signifies an excessive increase in the amount of defocusing. In Examples 1 through 5, by contrast, the maximum beam waist in the X-direction does not exceed 0.003 mm even if the amount of shift is 0.05 mm. When the lens L1 is shifted in the Y-direction, the maximum beam waist in the Y-direction does not exceed 0.003 mm when the amount of shift is 0.05 mm. This makes it possible to secure a greater tolerance of the misalignment in the direction of optical axis.

As shown in FIG. 19 and FIG. 20, in the Comparative Example, when the lenses L1 and L2 are shifted reversely in the X-direction, the beam waist position in the X-direction is 0.011 mm if the amount of shift is 0.05 mm. When the lenses L1 is shifted in the Y-direction, the beam waist position in the Y-direction is 0.011 mm if the amount of shift is 0.05 mm. This signifies an excessive increase in the amount of defocusing. In Examples 1 through 5, by contrast, when the lenses L1 and L2 are shifted reversely in the X-direction, the maximum beam waist in the X-direction does not exceed 0.004 mm even if the amount of shift is 0.05 mm. When the lenses L1 and L2 are shifted reversely in the Y-direction, the maximum beam waist in the Y-direction does not exceed 0.004 mm when the amount of shift is 0.05 mm. This makes it possible to secure a greater tolerance of the misalignment in the direction of optical axis.

As described above, a considerable suppression of the displacement of beam waist can be observed in the lenses A1 through A6 kept within 0.04<III<0.30, as compared to the lens B lying outside this range. Thus, when the third-order astigmatism coefficient III of the optical coupling lens is kept in the range of 0.04<III<0.30, preferably in the range of 0.05 <III<0.25, it is possible to reduce spot misalignment in the Z-axis direction resulting from lens position adjustment in the X- and Y-axis directions, and a high coupling efficiency can be achieved by lens position adjustment in the X- and Y-axis directions.

Tables 8 and 9 show comparison between the Comparative Example and the Example 2. In the Comparative Example, as shown in Table 8, when an attempt is made to correct the misalignment of optical axis of the lens L2 in the direction of optical axis by shifting the lens L1 in the direction perpendicular to the optical axis, the limit value wherein the coupling efficiency is not reduced below 90% is 66 μm in the X-direction, and 75 μm in the Y-direction. In the meantime, when an attempt is made to correct the axial misalignment between the semiconductor laser and the outgoing opening of the SHG element by shifting the lens L1 in the direction perpendicular to the optical axis, the limit value wherein the coupling efficiency is not reduced below 90% is 87 μm in the X-direction, and 81 μm in the Y-direction.

TABLE 8

| Comparative example | | |
|---|---|---|
| | X | Y |
| L2 tolerance (L1 correction) | 66 μm | 75 μm |
| SHG tolerance (L1 correction) | 87 μm | 81 μm |

TABLE 9

| Example 2 | | |
|---|---|---|
| | X | Y |
| L2 tolerance (L1 correction) | 129 μm | 153 μm |
| SHG tolerance (L1 correction) | 114 μm | 162 μm |

In Example 2, by contrast, as shown in Table 9, when an attempt is made to correct the misalignment of the lens L2 in the direction of optical axis by shifting the lens L1 in the direction perpendicular to the optical axis, the limit value wherein the coupling efficiency is not reduced below 90% is 129 μm in the X-direction, and 153 μm in the Y-direction. In the meantime, when an attempt is made to correct the axial misalignment between the semiconductor laser and the outgoing opening of the SHG element by shifting the lens L1 in the direction perpendicular to the optical axis, the limit value wherein the coupling efficiency is not reduced below 90% is 114 μm in the X-direction, and 162 μm in the Y-direction. As is apparent from the above, the lens of Example 2 secures a greater positioning tolerance for the semiconductor laser, SHG element and lens, and provides a semiconductor module characterized by excellent assembling advantages. When the lens satisfying the expression (8) in the lenses L1 and L2, further satisfies the expression (1) or expression (4), the lens reduces deterioration in coupling efficiency despite the decentering error that may remain uncorrected.

The present invention has been described in with reference to embodiments. It is to be expressly understood, however, that the present invention is not restricted thereto. It goes without saying that the present invention can be embodied in a great number of variations with appropriate modification or additions. For example, an optical fiber can be used instead of the second harmonic generation apparatus H2. In this case, the end of the optical fiber serves as the entrance aperture, and the interior thereof serves as the optical transmission line. Further, in the aforementioned embodiment, the optical element is displaced. However, it goes without saying that relative displacement of any one or more of the semiconductor light source, optical element and optical transmission line is also acceptable. The light to be detected by the light receiving element can be either the light emitted from the optical waveguide (having the same wavelength as that of the semiconductor light source) without having been subjected to wavelength conversion by the SHG element, or the light (e.g., half the wavelength of the semiconductor light source) having been subjected to wavelength conversion by the SHG element.

Further, in the aforementioned Examples, the optical coupling lens is made up of two glass lenses. However, the number and material of the lenses is not restricted thereto. If it is made of one or a plurality of optical coupling lenses formed of the material such as resin or glass that are commonly employed in the optical lens, the advantages of the present invention is effectively demonstrated.

Despite the aforementioned embodiment, there is no restriction to the element forming the optical waveguide. An optical fiber and similar materials can be used in addition to the SHG element.

What is claimed is:

1. An optical coupling lens for converging a light flux emitted from a light source to an entrance aperture,
   wherein the optical coupling lens is a collimation lens and satisfies the following expression:

$0.04 < III < 0.30,$ where III is a third-order astigmatism coefficient of the optical coupling lens, and
   wherein the optical coupling lens converges an approximately parallel light flux onto the entrance aperture.

2. An optical coupling lens for converging a light flux emitted from a light source to an entrance aperture, the optical coupling lens comprising:
   an optical surface in an aspheric shape facing a side of the optical coupling lens providing shorter conjugate distance than an opposite side of the optical coupling lens,
   wherein the optical coupling lens is a collimation lens and satisfies the following expression:

$0.04 < III < 0.30,$ wherein III is a third-order astigmatism coefficient of the optical coupling lens, and
   wherein the optical coupling lens satisfies the following expressions:

$6.5 \ \mu m < \Delta_{sag} < 30 \ \mu m,$ $h_{sag} = fb \times NA_{SHG} \times 1.3 + 0.10 \ mm,$ $NA_{SHG} = a/f,$ where $h_{sag}$ is a height from an optical axis of the optical coupling lens,
   $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, $\alpha$ is a height from the optical axis at $1/e^2$ intensity point of an incident light flux to the optical coupling lens, and f is a focal length of the optical coupling lens.

3. An optical coupling lens for converging a light flux emitted from a light source to an entrance aperture, the optical coupling lens comprising:

an optical surface in an aspheric shape facing a side of the optical coupling lens providing shorter conjugate distance than an opposite side of the optical coupling lens, wherein the optical coupling lens is a collimation lens and satisfies the following expression:

$$0.04<III<0.30,$$

where III is a third-order astigmatism coefficient of the optical coupling lens, and wherein the optical coupling lens satisfies the following expressions:

$$8 \ \mu m<\Delta_{sag}<40 \ \mu m,$$

$$h_{sag}=fb \times NA_{SHG} \times 1.3+0.12 \ mm,$$

$$NA_{SHG}=\alpha/f,$$

where $h_{sag}$ is a height from an optical axis of the optical coupling lens, $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, $\alpha$ is a height from the optical axis at $1/e^2$ intensity point of an incident light flux to the optical coupling lens, and f is a focal length of the optical coupling lens.

4. The optical coupling lens of claim 1 for use in a second harmonic generation apparatus.

5. The optical coupling lens of claim 1 for use in an optical transmitting and receiving apparatus.

6. A light source module comprising:

a light source;

an optical waveguide; and an optical unit comprising one or more of an optical coupling lens for converging a light flux emitted from the light source onto the optical waveguide, wherein at least one of the optical coupling lens is a collimation lens and satisfies the following expression:

$$0.04<III<0.30,$$

where III is a third-order astigmatism coefficient of the optical coupling, lens, and wherein the optical coupling lens satisfying the following expression: 0.04<III<0.30 comprises an optical surface in an aspheric shape facing a side of the optical coupling lens providing shorter conjugate distance than an opposite side of the optical coupling lens, wherein the optical coupling lens satisfies the following expressions:

$$6.5 \ \mu m<\Delta_{sag}<30 \ \mu m,$$

$$h_{sag}=fb \times NA_{SHG} \times 1.3+0.10 \ mm,$$

$$NA_{SHG}=\alpha/f,$$

where $h_{sag}$ is a height from an optical axis of the optical coupling lens, $\Delta_{sag}$ is a positional difference at the height $h_{sag}$ between the aspheric shape and a spherical shape arranged at a same position on the optical axis to the aspheric shape and having a predetermined local axial radius, fb is a back focus of the optical coupling lens, $\alpha$ is a height from the optical axis at $1/e^2$ intensity point of an incident light flux to the optical coupling lens, and f is a focal length of the optical coupling lens.

7. The light source module of claim 6, further comprising an actuator moving the optical coupling lens satisfying the following expression 0.04<III<0.30 only in a direction perpendicular to the optical axis of the optical coupling lens, for adjusting a coupling efficiency to the waveguide.

8. A light source module comprising:

a light source;

an optical waveguide; and an optical unit comprising an optical coupling lens for converging a light flux emitted from the light source onto the optical waveguide, wherein the optical coupling lens is a collimation lens and satisfies the following expression:

$$0.04<III<0.30,$$

where III is a third-order astigmatism coefficient of the optical coupling lens, and wherein the optical coupling lens satisfying the following expression: 0.04<III<0.30 comprises an optical surface in an aspheric shape facing a side of the optical coupling lens providing shorter conjugate distance than an opposite side of the optical coupling lens, wherein the optical coupling lens satisfies the following expressions:

$$8 \ \mu m<\Delta_{sag}<40 \ \mu m,$$

$$h_{sag}=fb \times NA_{SHG} \times 1.3+0.12 \ mm,$$

$$NA_{SHG}=\alpha/f,$$

where $h_{sag}$ is a height from an optical axis of the optical coupling lens, $\Delta_{sag}$ is a difference at the height $h_{sag}$ between the aspheric shape and a spherical shape arranged at a same position on the optical axis to the aspheric shape and having a predetermined local axial radius, fb is a back focus of the optical coupling lens, $\alpha$ is a height from the optical axis at $1/e^2$ intensity point of an incident light flux to the optical coupling lens, and f is a focal length of the optical coupling lens.

9. The light source module of claim 6, wherein the optical unit comprises two optical coupling lenses.

10. The light source module of claim 6, wherein the optical unit further comprises a collimation lens emitting an approximately parallel light flux, and the optical coupling lens satisfying the following expression: 0.04<III<0.30, converges the approximately parallel light flux onto the optical waveguide.

11. The light source module of claim 6, wherein optical coupling lens in the optical unit is a glass lens.

12. The light source module of claim 6, wherein the optical unit comprises an optical coupling lens facing the light source and an optical coupling lens facing the optical waveguide, both the optical coupling lens facing the light source and the optical coupling lens facing the optical waveguide being in a same shape.

13. The light source module of claim 6, further comprising a drive device for driving the optical coupling lens in a direction perpendicular to the optical axis.

14. The light source module of claim 6,
wherein the optical waveguide is a second harmonic generation element or an optical fiber.

15. The light source module of claim 8, further comprising an actuator moving the optical coupling lens satisfying the following expression 0.04<III<0.30 only in a direction perpendicular to the optical axis of the optical coupling lens, for adjusting a coupling efficiency to the waveguide.

16. The light source module of claim 8,
wherein the optical unit comprises two optical coupling lenses.

17. The light source module of claim 8,
wherein the optical unit further comprises a collimation lens emitting an approximately parallel light flux, and the optical coupling lens satisfying the following expression: 0.04<III<0.30, converges the approximately parallel light flux onto the optical waveguide.

18. The light source module of claim 8,
wherein the optical coupling lens in the optical unit is a glass lens.

19. The light source module of claim 8,
wherein the optical unit comprises an optical coupling lens facing the light source and an optical coupling lens facing the optical waveguide, both the optical coupling lens facing the light source and the optical coupling lens facing the optical waveguide being in a same shape.

20. The light source module of claim 8, further comprising a drive device for driving the optical coupling lens in a direction perpendicular to the optical axis.

21. The light source module of claim 8,
wherein the optical waveguide is a second harmonic generation element or an optical fiber.

* * * * *